US011210587B2

United States Patent
Ananthanarayanan et al.

(10) Patent No.: US 11,210,587 B2
(45) Date of Patent: Dec. 28, 2021

(54) DISTRIBUTED LEARNING ANOMALY DETECTOR

(71) Applicant: ScienceLogic, Inc., Reston, VA (US)

(72) Inventors: Shankar Ananthanarayanan, Ashburn, VA (US); Nicole Eickhoff, Woodbridge, VA (US); Tim Herrmann, Bon Air, VA (US); Matthew Luebke, Front Royal, VA (US); Mathew Maloney, Austin, TX (US)

(73) Assignee: ScienceLogic, Inc., Reston, VA (US)

( * ) Notice: Subject to any disclaimer, the term of this patent is extended or adjusted under 35 U.S.C. 154(b) by 0 days.

(21) Appl. No.: 16/856,905

(22) Filed: Apr. 23, 2020

(65) Prior Publication Data

US 2020/0364561 A1    Nov. 19, 2020

Related U.S. Application Data

(60) Provisional application No. 62/837,611, filed on Apr. 23, 2019, provisional application No. 62/837,593,
(Continued)

(51) Int. Cl.
*G06N 3/08* (2006.01)
*H04L 29/06* (2006.01)
*G06N 3/04* (2006.01)

(52) U.S. Cl.
CPC ............. *G06N 3/08* (2013.01); *G06N 3/04* (2013.01); *H04L 63/1425* (2013.01)

(58) Field of Classification Search
None
See application file for complete search history.

(56) References Cited

U.S. PATENT DOCUMENTS 9,077,611 B2   7/2015 Cordray et al.
9,418,040 B2   8/2016 Cordray et al.
(Continued)

FOREIGN PATENT DOCUMENTS

EP   3223487 A1   9/2017
WO   2017011667 A1   1/2017

OTHER PUBLICATIONS

Jakub Konečný et al., "Federated learning: strategies for improving communication efficiency", arXiv preprint arXiv:1610.05492 (2016), 10 pages. (Year: 2016).*
(Continued)

*Primary Examiner* — Vincent Gonzales
(74) *Attorney, Agent, or Firm* — Nixon & Vanderhye P.C.

(57) ABSTRACT

In a network discovery and management system, a machine learning (ML) DLAD processor trains, validates, updates, and stores machine learning models. A ML training data preparation program performs operations to process and format input data to generate ML training data that can be used to train ML models. ML training program uses the ML training data to train ML models, thereby generating trained ML models. The ML training program can re-train or update the training of ML models as the system collects additional data and produces additional estimates, predictions, and forecasts. ML model validation program performs validation testing on trained ML models to generate one or more metrics that can indicate accuracy of predictions generated by the trained models. The resulting ML model(s) can be used to manage the network including but not limited to retrieve, instantiate and execute dynamic applications based on predictions made based on the models.

24 Claims, 9 Drawing Sheets

Related U.S. Application Data filed on Apr. 23, 2019, provisional application No. 63/014,082, filed on Apr. 22, 2020.

(56) References Cited

U.S. PATENT DOCUMENTS

| | | |
|---|---|---|
| 9,537,731 B2 | 1/2017 | Link et al. |
| 9,912,546 B2 | 3/2018 | Chart et al. |
| 2010/0094981 A1* | 4/2010 | Cordray ................ H04L 41/082 709/222 |
| 2015/0193693 A1 | 7/2015 | Vasseur et al. |
| 2017/0339022 A1* | 11/2017 | Hegde .................. G06N 3/0445 |
| 2020/0220869 A1* | 7/2020 | Singh ...................... G10L 17/00 |
| 2020/0302271 A1* | 9/2020 | Ovtcharov .............. G06F 7/483 |

OTHER PUBLICATIONS

Prasanta Gogoi et al., "A survey of outlier detection methods in network anomaly identification", The Computer Journal 54.4, 2011, pp. 570-588. (Year: 2011).*

International Search Report and Written Opinion for corresponding PCT/US2020/029540, dated Jul. 27, 2020.

\* cited by examiner

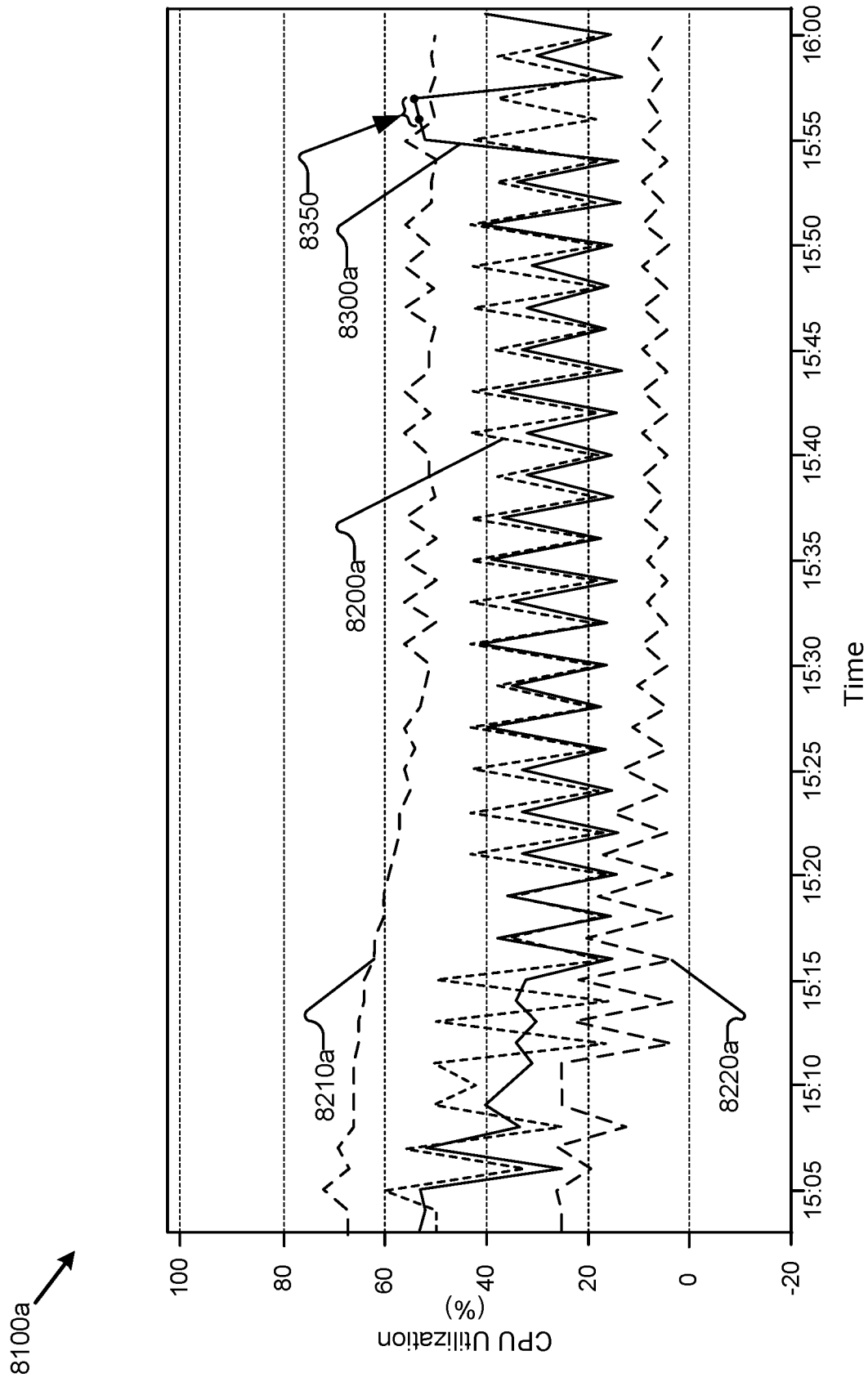
Figure 8A: Spikes within the normal range of the system during a season of low load

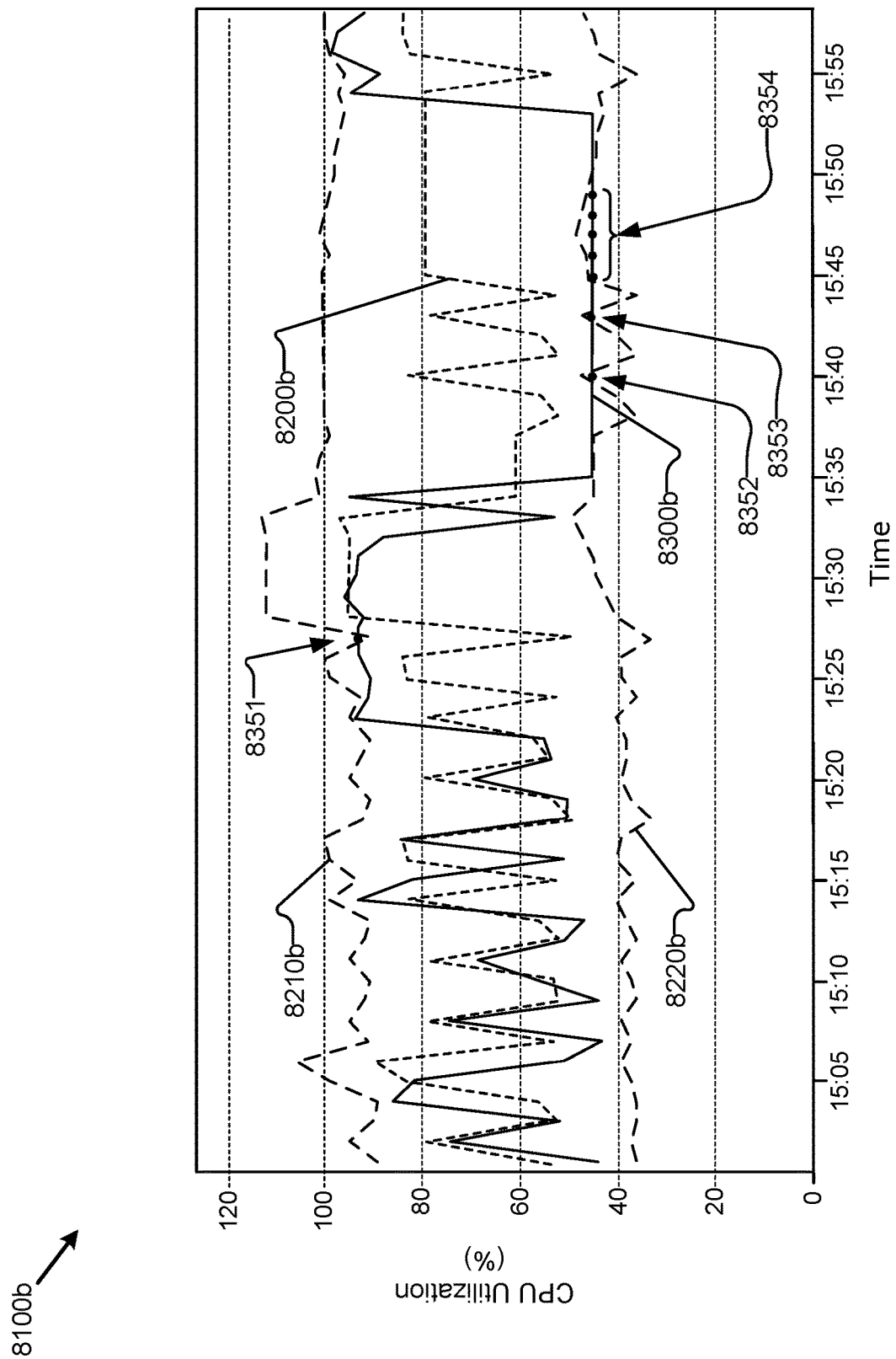
Figure 8B: Flatlined signals

DISTRIBUTED LEARNING ANOMALY DETECTOR

1 CROSS REFERENCE TO RELATED U.S. PATENT APPLICATIONS

The present application claims priority under 35 U.S.C. § 119(e) to provisional U.S. Patent Application Ser. No. 62/837,611 filed Apr. 23, 2019, provisional U.S. Patent Application Ser. No. 62/837,593 filed Apr. 23, 2019, and provisional U.S. patent application Ser. No. 63/014,082 filed Apr. 22, 2020, all of which are incorporated herein by reference in their entirety and for all purposes.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2019-2020, ScienceLogic, Inc.

3 BACKGROUND OF THE TECHNOLOGY

3.1 Field of the Technology

The exemplary, illustrative, technology herein relates to a system for defining, creating, and distributing a Distributed Learning Anomaly Detector (DLAD), and subsequently using a Distributed Learning Anomaly Detector (DLAD) to detect anomalies in collected network information, synthesizing one or more DLAD generated datum, and distributing these generated datum and related information about the detected anomalies, and publishing one or more DLAD distributed datum describing at least one aspect of the learned operation of the managed network and its managed components. The technology herein has applications in the areas of network and computer systems management.

3.2 The Related Art

Existing network management systems (NMS) collect data from multiple sources that represent differing, uncorrelated views of network-connected devices, computer systems, and computer system components that are under the management of the NMS. As used in this application, the terms "component" and "system" are intended to refer to a computer-related entity, either hardware, a combination of hardware and software, software, or software in execution. For example, a component can be, but is not limited to being, a program running on a processor, a processor, an object, an executable, a thread of execution, a program, and/or a computer. By way of illustration, both an application running on a server and the server itself can be a component. One or more components can reside within a process and/or thread of execution, and a component can be localized on one computer and/or distributed between two or more computers.

Historically, systems monitoring techniques have relied upon statistical parameters such as mean, standard deviation, and the related Deming-style control bands to determine when a monitored system or component are operating in a manner that requires attention. As systems and their component relationships become more complex, simple statistical calculations on well-defined control metrics originating from a single component have lesser value in determining when a component or collection of components may be encountering operational challenges. Compounding this challenge is that each of the specified component data value sources have different reporting or polling schedules, data formats, availability/uptime, and accuracy. It is a challenge to a-priori determine, at any particular point in time, which data source provides the most current and accurate operational data descriptive of the operation of the computer system or computer system component, and which represent an indicia of anomalous operation by a component. Furthermore, the same data values may indicate anomalous behavior for one deployed set of components monitored by a first NMS, and represent normal behavior for a second deployed set of components monitored by a second NMS. Additional methods of data correlation and anomaly identification are needed to meet these challenges.

Existing learning systems do not support the portability of the learning component configuration, requiring each newly created instance of the learning system to train anew, nor do they support the parallel simultaneous implementation of a plurality of different sets of collected datum, each providing independent anomaly detection and related operational predictions for the managed components and systems.

Similarly, it has proven challenging to provide a learning system that uses generalized representations of network device (and network) performance which then updates its learnings based upon actual deployed data, and then integrates those learnings into the classification, alerting, and monitoring functions of an NMS. Similarly, if multiple learning models are available, there has been no method to automatically select the most appropriate model from the set of available models, and to then deploy and continually train a different trained model for each data element of set of collected data.

Lastly, existing learning network management systems require manual training or large amounts of manually prepared training data in order to effectively determine operational anomalies. A solution that eliminates the manual preparation of training data for ongoing training activities, and supports short processing windows, is needed.

4 SUMMARY OF THE TECHNOLOGY

Example network management apparatus, method, and storage device may comprise providing a portable encoding of an initial machine learning-trained hyperparameter data set for at least one proto-typical network device as a dynamic application configured for execution at a target network management domain, the initial hyper-parameter data set providing initial parameters for continued untrained machine learning about devices that that are part of the target network management domain; configuring a dynamic application to use the initial machine learning-trained hyperparameter data set to monitor at least one set of data collected at the target network management domain independently of the initial hyperparameter training data; and based on the monitoring, using the initial machine learning-trained hyperparameter data set or a hyperparameter data set derived, at least in part, from the machine learning-trained hyperparameter data set to discover operational condition events in the set of data collected at the target network management domain.

The network management may further comprise further training the portable initial machine learning-trained hyperparameter data set at the target network management domain with the monitored data to derive a locally trained hyperparameter data set, e.g., using the hyperparameter data set to configure a deep neural network.

The network management may further comprise determining whether a monitored operational condition event associated with one or more data set elements is an anomaly event.

The network management may further comprise using the hyperparameter data set to monitor discovered operational condition events and predict whether the events are anomalous; and using results of the prediction to manage at least one aspect of the target network management domain. Such network management may further comprise configuring an alerting component for anomalous value thresholds of a monitored data element in accordance with the anomaly determination, comparing a collected data set value against the anomalous value thresholds, and generating an alert or notification upon the comparison indicating the collected data set value is outside at least one of the anomalous value thresholds.

The network management may further comprise calculating one or more predicted future data values for a monitored data element and storing the calculated predicted future data values. The network management may further comprise using event tags to predict whether observed events represented by the collected data are anomalous. The network management may further comprise using a model registry and a training handler to interface with the hyperparameter data set. The network management may further comprise configuring the dynamic application using a DLAD specification. The network management may further comprise discovering anomalies by running the dynamic application as part of a DLAD engine of a network management device.

These and other aspects and advantages will become apparent when the Description below is read in conjunction with the accompanying Drawings.

5 TERMS

The following terms are used within this document and have the defined meanings.

| Term | Definition |
| --- | --- |
| Anomalous | Behavior of a device (as evidenced by one or more collected data values) that is unpredicted, beyond established thresholds, or is a cluster outlier. |
| DLAD | Distributed Learning Anomaly Detector |
| Classify | A process for making a determination that a DLAD collected datum is a member of a class of data, e.g. anomalous or non-anomalous classification. |
| Collector | A component that interfaces with one or more network connected devices in order to read one or more data values related to the operation of the network connected device and makes that data available to other systems or components. |
| Correlation | A process of associating the behavior of two or more DLAD datum as related. |
| Data analysis | One or more process steps that correlate DLAD datum, classify DLAD datum, predict one or more outcomes on the basis of DLAD datum and/or or one or more additional DLAD process outputs. |
| DLAD processing | The processes for at least one of data collection, data analysis, data storing, and data publishing performed by a DLAD processor or DLAD-enabled device. |
| DLAD data set | Collection of DLAD data, including one or more distinct sets of DLAD datum value selected from collected and generated DLAD data |
| DLAD datum/ DLAD data | Collective term for one or more DLAD parameters, DLAD collected datum, DLAD generated datum, and DLAD distributed datum. |
| DLAD dynamic application | A dynamic application that defines DLAD progressing, including one or more program specifications, DLAD parameters, applicable data types, data sources, and similar information as defined herein. A dynamic application is instantiated by establishing all needed external requirements, such as external data sources, data stores, and external programs, and is executed by a processor in accordance with its parameterization. |
| DLAD parameters | Datum values that are parametric inputs to a DLAD process or specification. |
| DLAD collected datum/data | Datum values that are collected from one or more computer systems or components and are used as data upon which the DLAD processes operate. |
| DLAD generated datum/data | DLAD parameters and other datum values generated by a DLAD component. |
| DLAD distributed datum/data | DLAD generated datum, DLAD events, and/or DLAD alerts generated by a DLAD component. |
| Event tag | Part of stored data that encodes one or more data processing results and is stored with the processed data. |
| Hyperparameter | A hyperparameter is a configuration for a trained model that is external to the trained model and is used to parameterize the use of the trained model. |
| Model | A machine learning algorithm, model parameters, and hyperparameters. A trained model is a model which has parameters and hyperparameters that have been defined as a result of a machine learning training process. |
| Prediction | A machine-based assessment of what a device will provide in the future for its collected data. If the device does not provide the expected collected data, the collected value is considered an anomaly. |
| Managed components | Computer systems, networks, and their respective components that are managed by an NMD/NMS or DLAD processor. |
| NMD/NMS | Network Management Device/Network Management System. |

6 BRIEF DESCRIPTION OF THE DRAWINGS

The features of the present technology will best be understood from a detailed description of the technology and example embodiments thereof selected for the purposes of illustration and shown in the accompanying drawings in which:

FIG. 8A depicts a first exemplary plot of collected DLAD data values and generated DLAD data values generated by a DLAD processor.

FIG. 8B depicts a second exemplary plot of collected DLAD data values and generated DLAD data value generated by a DLAD processor.

7 DESCRIPTION OF SOME EMBODIMENTS OF THE TECHNOLOGY

7.1 Overview

Figure 1:
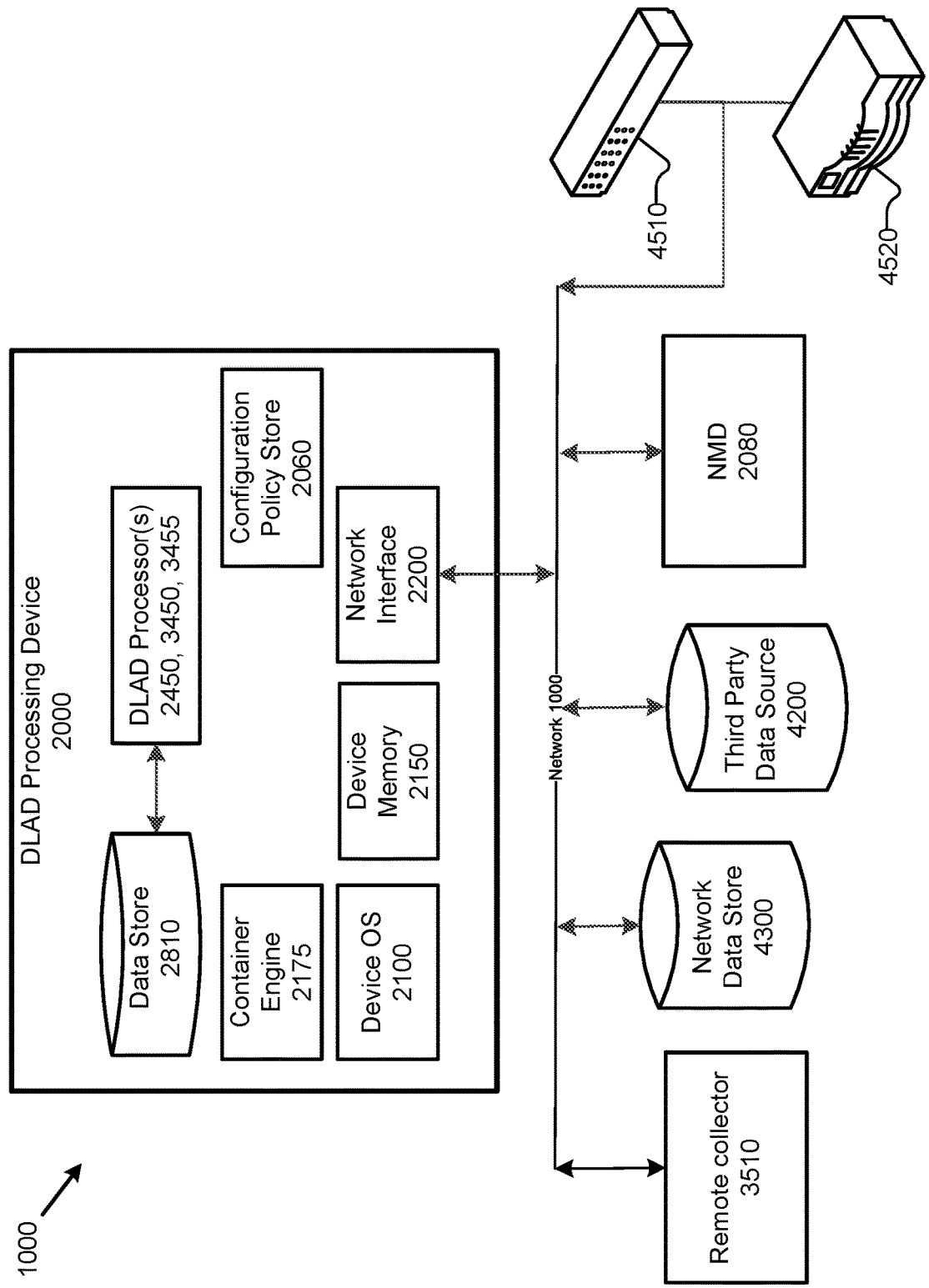
FIG. 1 depicts an exemplary DLAD processing device, in accordance with the illustrative technology herein.

A DLAD processing device (e.g. stand-alone DLAD processor, DLAD-enabled NMD, or network management system (NMS) configured with DLAD functionality) configured in accordance with the illustrative technology herein comprises one or more specialty programs that comprise a DLAD processor. A DLAD processor is configured using one or more DLAD specifications in order to collect the required data (e.g. DLAD collected data) from one or more network devices and/or data collected about network devices by other systems, analyze the DLAD collected data using one or more trained machine learning models, classify the DLAD collected data in order to determine whether each collected data value represents a type of device behavior, and then make a determination as to the operational state of the monitored device or component(s). The system uses these determinations to create and publish one or more DLAD data values, alerts, and events, which are utilized by (reported upon, monitored, and managed) by a NMS or other network management application in order to manage an aspect of a network or network-connected device.

The DLAD processor performs the instructions embodied in a DLAD specification by collecting the specified collected data in accordance with parameters of the specification, analyzing one or more DLAD data values in accordance with the DLAD specification, determining a classification as to whether the collected data is anomalous or not with respect to a specific managed device or set of managed devices, storing and/or publishing those newly created DLAD data values in accordance with the DLAD specification(s), and generating any alerts or events specified upon the basis of the classification. In a specific example embodiment, events are generated when a DLAD processor determines that collected data are anomalous with a certainty that is greater than a threshold value encoded in the DLAD specification. If so the DLAD processor generated events that may be used to start one or more diagnostic workflows in a DLAD-enabled NMS or another external NMS. The results of the workflow may be captured and used to further tag the analyzed data using one or more event tags, providing a training feedback loop that further trains the DLAD processor's operation. Thus, if the workflow finds that there is no operational problem, the DLAD processor learns that the prediction confidence (probability) of a specific predicted problem's occurring as a result of an anomaly being detected is reduced, while the workflow indicates that a problem was found, the DLAD processor learns that the anomaly predicted a problem and the prediction confidence is increased. This results in a continuous learning system that is more effective than traditional thresholding/baselining techniques at identifying anomalous behaviors. Furthermore, the learning system continues to evolve, improving its accuracy and confidence, and changing as the underlying collected data indicates that monitored device performance changes.

Aspects of Network Management Systems (NMS), Network Management Devices (NMD) and dynamic applications are described in U.S. Pat. No. 9,912,546 ("Component detection and management using relationships"); U.S. Pat. No. 9,537,731 ("Management techniques for non-traditional network and information system topologies"); U.S. Pat. No. 9,418,040 ("Dynamically deployable self-configuring distributed network management system"); and U.S. Pat. No. 9,077,611 ("Self configuring network management system"), incorporated herein by reference.

7.2 Exemplary System Architecture

7.2.1 DLAD Processing Device

A DLAD processing device comprises at least one DLAD processor implemented on a stand-alone network-connected computer, a component of a larger network-connected computer, or as service instance running in a virtualized or containerized environment. In some embodiments, the DLAD processing device may be integrated with one or more NMS-based collector or remote collector arrangement(s) in order to receive inputs from those collectors. In other embodiments, the DLAD processing device may support its own data collection infrastructure to collect operational data from network devices and report upon specific selected collected data (e.g. DLAD collected data). In still other embodiments, the DLAD processing device may be integrated with a network database or network data stores containing network management data values collected by another network management system, as specified in the DLAD specification.

As depicted in FIG. 1, an exemplary DLAD processing device (2000) is configured to obtain current DLAD collected data values from the specified monitored network connected devices (or from previously collected data in a data store), determine whether these collected data represent normal or anomalous behavior (over a specified period of time) of the monitored network-connected devices, generate DLAD data values associated with the determination, and then publish these generated DLAD data values for use by other systems.

The DLAD processing device comprises one or more DLAD processor(s) (2450), machine-learning-enabled DLAD processors (3450), and/or modular microservices machine learning-enabled processors (3455), which are discussed in further detail below. The DLAD processing device (2000) further comprises device memory (2150) and a device operating system (OS) (2100) of standard construction known to those having skill in the art, such as, for example without limitation, the WINDOWS operating system (Microsoft Corporation, Redmond, Wash.), UNIX, LINUX, or MACOS (Apple Computer, Cupertino, Calif.). Still other implementations may not have an operating system per se, but instead provide an environment for executing coded instructions or interpreted programs (e.g., Java programs). In such cases, the execution environment is considered to be acting as the operating system. Further implementations include containerized applications, e.g., modular microservices, that are configured as container images. In these further implementations, the DLAD processing device includes a container engine (2175), operating on the host OS, for loading and running the applications encoded in the container images. The container engine comprises a suitable runtime environment for modular microservices, for example Docker, CoreOS rkt, Mesos Containerizer, LXC Linux Containers, OpenVZ, and crio-d or any other runtime engine conforming to the Open Container Initiative (OCI). In such cases, the container engine is considered to be acting as the operating system.

The DLAD processing device further comprises at least one network interface (2200) that provides a mechanism for communicating data with one or more network-connected devices on the network using a communications protocol. The network interface comprises a physical hardware interface, for example a network interface card (NIC) that includes one or more network or serial interfaces (e.g., one or more Ethernet, FireWire, USB, or RS-232 interfaces), one or more wireless interfaces (e.g., one or more of WiFi, BlueTooth, or LTE interfaces), or a software network interface (e.g., an IPv4 or IPv6 loopback interface). The network interface is used to implement wired- or wireless communications protocols in order to communicate with other devices on a network, such as TCP/IP over Ethernet, or TCP/IP over 802.11g.

The DLAD processing device (2000) further comprises a configuration policy store (2060) and one or more data stores (e.g. 2810). The configuration policy store stores configuration information for the DLAD processing device, and may be implemented as a stand-alone data store, as a file, or within another data store such as data store (e.g. data stores 2810, 3070, or 3090). A configuration policy specifies the aspects of DLAD processing to be performed by a specific instance of a DLAD processor, by specific DLAD processing device(s), or by other systems that the DLAD processing device is connected to over the network.

Data stores may be implemented as a commercial database such as a commercial database provided by mySQL, Oracle (by Oracle Corporation), SQLServer (by Microsoft Corporation), other relational or alternative database/storage structures such as NoSQL, or even as a file system of stored files. Data stores may be distinguished by type of data, and may be segregated by data type or may be consolidated for efficiency. For clarity, different data stores may be named in part with the type of data stored in them. For example, if model information is stored in a data store, the data store may be called a model data store, sometimes called a model registry. Each instance of a data store may be located upon one or more DLAD processing device(s), on external network management device(s), or on a stand-alone network accessible data store (4300). Data stores may be replicated in order to improve access and redundancy to the information stored in them. Depending upon the specifics of each data store's underlying data storage mechanism, data store replication may be implemented using multiple master, master-slave, or caching-based technologies. Data store information also may be cached in order to promote higher availability and throughput. An exemplary generic combination data store (2810) stores DLAD specifications, information collected from the network-connected devices, generated DLAD data values generated by the DLAD processor (2450), machine learning model information, and DLAD processing results and events. Throughout the specification, various data store types are identified for clarity, without deviating from the above definitions.

The example network (1000) comprises a network data store (4300), a network switch (4510), a router (4520), a network management device (NMD) (2080), a third party data source (4200), and a remote collector (3510), which are all communicatively coupled to a DLAD processing device (2000) using standard networking techniques. The DLAD processor communicates with each of the network connected devices in order to read the specified collected data that pertains to one or more aspects of the network connected device's performance. In additional exemplary embodiments, DLAD processing device (2000) communicates with an NMD to collect data collected by the NMD or exchange data with the NMD. For example, the DLAD processing device (2000) communicates one or more network device monitoring results, DLAD data values calculated by the DLAD processor (2450), or various DLAD processor generated alerts or events to the NMD. In an alternative example, the DLAD processing device communicates information about its determination that one or more monitored network devices and/or network device components are operating in an anomalous manner by generating an alert based upon the results of one or more classifications of collected data to the NMD.

7.2.2 DLAD Processor

Figure 2:
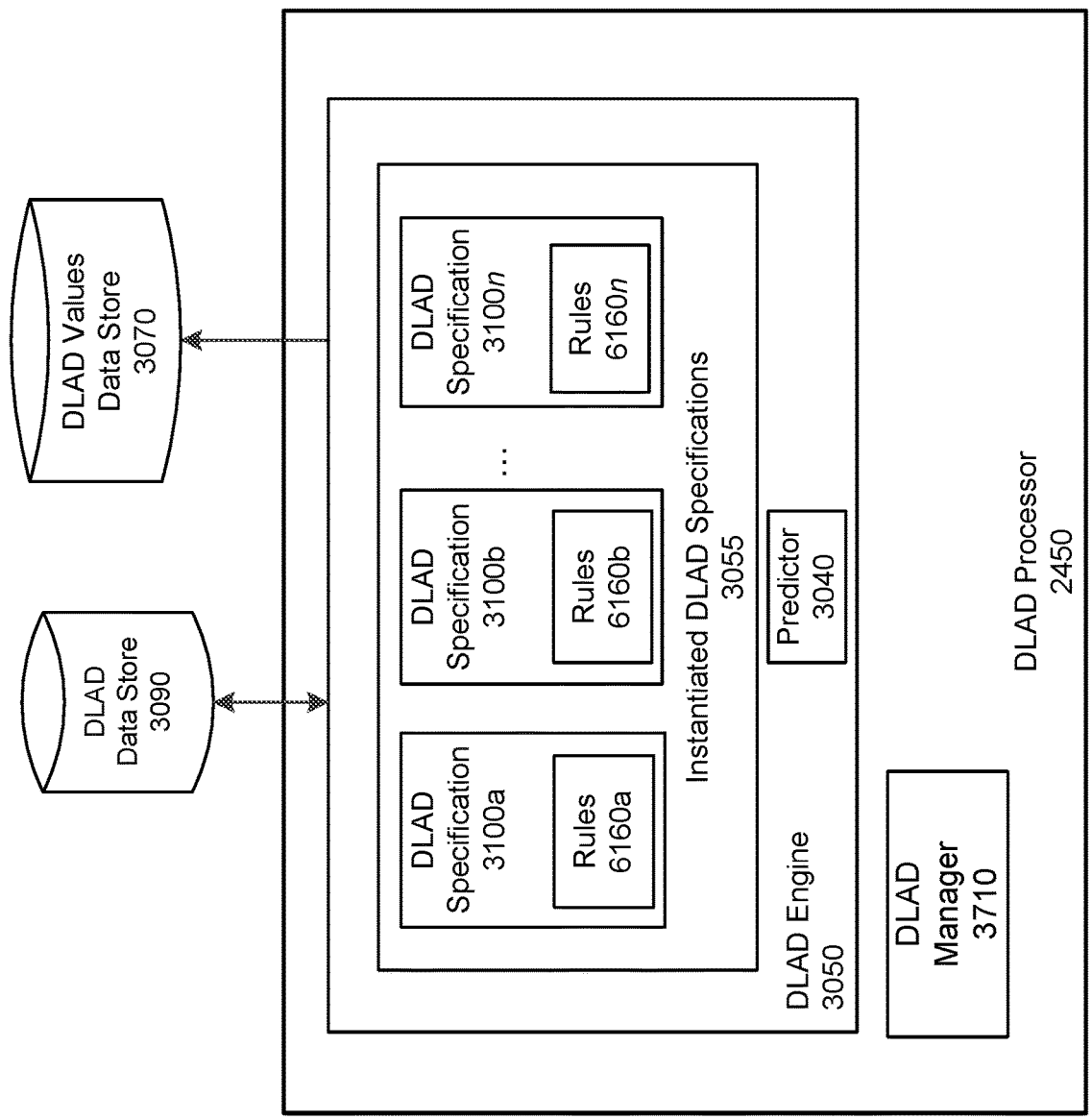
FIG. 2 depicts an exemplary DLAD processor for processing DLAD specifications, in accordance with the illustrative technology herein.

An exemplary implementation of a DLAD processor component is depicted in FIG. 2. A DLAD processor further includes a DLAD engine (3050) program, which instantiates one or more DLAD specifications (3055). In an embodiment, each individual instantiation of a DLAD specification (3100a, 3100b, . . . 3100n) is represented as a discreet process, thread, or a set of states within a state machine within the DLAD processor (2450) and having its own collection, calculation, analysis, classification, and publishing rules (6160a, 6160b, . . . , 6160n). The DLAD engine includes a predictor engine program (3040), which generates predicted DLAD data values by processing collected DLAD data values in accordance with one or more DLAD specifications, for example using a trained ML model or another prediction-generating algorithm. The DLAD processor program(s) execute in accordance with each of the instantiated DLAD specifications in order to generate and publish DLAD data values, DLAD anomalous behavior alerts, and DLAD events.

The DLAD processor uses a configuration policy in order to determine which DLAD specifications are authorized to be instantiated by the DLAD processor. A DLAD specification is instantiated when it is processed by the DLAD processor, and is subsequently performed when the process, thread, or state machine states that implement the DLAD specification are created. The DLAD values data store (3070) is used by the DLAD processor to store DLAD specifications, current processing state(s), and generated DLAD data value(s). DLAD data is stored and retrieved from one or more internal or external data stores (e.g. data store 3090).

A DLAD manager (3710) manages the DLAD processing provided by the DLAD processor. Specifically, the DLAD manager manages the instantiation of DLAD specifications.

Referring to FIGS. 1, 2, 3 and 4, the DLAD manager reads the DLAD specification's Input Data Sources/Collection Methods Specification (6150) to determine the sources of data that are to be used for processing the DLAD specification. The DLAD manager then determines which input data interface(s), i.e. one or more network interfaces (2200), network interfaces (2200), collector plug-ins (2730), and/or receive interfaces (2610) are capable of providing the specified collected data, for example one or more of data values, metadata, and configuration data, for use in calculating one or more DLAD generated data value(s). In operation, the DLAD processor (2450) loads one or more DLAD specifications from a data store (2810), determines the collected DLAD data required to process the DLAD specifications, and configures one or more input data interfaces, for example one or more of a direct hardware interface or a separate network interface (collectively shown as a network interface) to receive the required collected DLAD data. For example, the DLAD processor configures a network interface (2200) to obtain the specified collected data directly from one or more network devices and configures a network interface (2200) to communicate with the network device in order to collect the specified input data from one or more non-network devices. Alternatively, the DLAD processor configures (or specifies the configuration of) one or more external components (e.g. collectors, remote collectors, NMDs, external databases, and third party data sources) in order to obtain the specified data.

The DLAD processor may also interact with one or more "remote collectors" (not shown), e.g., stand-alone remote collectors or collectors operating as part of an NMS, in order to obtain specific collected DLAD data as required by the DLAD processor. For example, the DLAD processor informs a collector that it requires VM CPU usage and virtual machine CPU and memory usage data for a specific host. The Collector determines if one or more plug-ins capable of collecting the data requested by the DLAD processor are running (or are being executed by the collector) and, if so, passes data collected by the plug-ins to the DLAD processor. The collector, if necessary, downloads and executes one or more collector plug-ins (e.g. dynamic applications) in order to collect the data requested by the DLAD processor.

The DLAD manager may establish a timer, polling schedule, or other data retrieval schedule for receiving data from the identified collector plug-ins, data collection applications, and/or receive interfaces according to the DLAD specification's reporting update frequency specification (6140). In this case, the DLAD manager starts a timer or polling process in which it retrieves or otherwise receives collected DLAD data from one or more data collection applications and/or network interfaces. The same timer/polling scheduling may be used to periodically schedule analysis processes by the DLAD manager.

Once the data is collected, the DLAD processor executes one or more analysis application programs (or specialized analysis components) in order to analyze the collected DLAD data, as parameterized by one or more DLAD specifications, and makes a determination as to whether the collected DLAD data represents an anomalous behavior by one or more monitored devices, and/or to determine whether there are any correlations between the various collected DLAD data or the behavior of the devices that produce the collected data, and to further determine any actions required by the DLAD processor or an NMS to identify hidden topology information about the network. For example, it may be discovered that the processor load on a monitored web service increases at the same time as the processor load on a second web service. While the relationship between the two services is not clear from the analysis, the analysis permits the system to identify a potential "hidden" topological link between the two web services, and then automatically conduct discovery and collection activities in order to confirm or refuse the existence of that topological link. Similarly, if two disparate data values indicate a common anomaly pattern, the system can infer a topological link that can be subsequently automatically discovered.

The analysis program to use are defined by a DLAD specification. A first example analysis program is a cluster analysis program, for which the DLAD specification including analysis rules and/or the DLAD prediction calculation rule defines one or more "normal" data cluster specifications and the system uses the rule specifications to identify the analysis program to use and one or more cluster specifications that parameterize the analysis program, where the identified analysis program is executed to cause the collected data to be compared to the cluster specification(s) in order to determine if the collected data falls inside or outside the boundaries of one or more previously identified clusters.

A second example analysis program is a rules-based pattern recognition analysis in which the DLAD specification analysis rule and/or the DLAD specification prediction calculation rule defines one or more "normal" patterns of network behavior or expected events determined, for example by a ML model trained on collected DLAD data values. Newly collected DLAD data values are compared to the normal patterns and events encoded in one or more pattern specifications, to determine if the collected data conforms to expected patterns. If a group collected data values includes patterns or events that are not expected, does not include expected patterns or events, includes patterns that are different from expected patterns, or patterns that are mis-ordered, the group of collected data values is considered to be "anomalous."

A third example analysis program is a predictions generation and comparison analysis in which the DLAD specification analysis rule and/or the DLAD prediction calculation rule defines one or more trained ML models to generate, based on collected DLAD data, future predicted DLAD data values and further defines an upper and lower bounds of predicted data values. Newly collected DLAD data values are compared to predicted DLAD data values and newly collected data values that fall outside of either the upper or lower bounds of the predicted data values are considered to be "anomalous", and are processed by the system as discovered anomalies.

Similarly, the system attempts to determine correlations between various collected data using a variety of approaches. In addition to the machine learning aspects described below, the DLAD processor may use extrinsic data such network graphs and component relationship graphs to establish the basis for one or more data correlations. The references to these external data elements are defined in analysis rules of one or more DLAD specifications.

Within the scope of the executing analysis programs, the system also may further determine predictions on whether the collected data is anomalous, and if so, what the type of anomaly is present. Other predictions may be performed, such as the change of a future failure of the device that created the collected data. Each prediction is associated with a minimum confidence value for the prediction to be valid, a maximum valid confidence value, a computed confidence value, and one or more action descriptions to take if the predicted confidence value falls between the minimum and maximum confidence thresholds. If the prediction confidence value is above a minimum threshold specified in the event and alerting rule specification, then the action specified for the prediction is performed by the DLAD processor. The action may be to generate one or more events or alerts, or to start a workflow to further diagnose the anomalous situation.

Upon completion of processing, the DLAD manager outputs the newly generated DLAD data values, events, and alerts (along with any event tags) in accordance with the DLAD specification. At the start of its execution, the DLAD manager is configured using one or more DLAD specification(s) in order to cause it to generate one or more DLAD data values in one or more desired formats from the results of the processing. In a specific exemplary embodiment, a format selected is one that is readable and usable by external network management systems and other network components. For example, the DLAD specification specifies output data values in a format that conforms to measurements from a direct source, or that an alert should be published as an SNMP trap.

In some implementations, the DLAD processor includes a DLAD event manager (3740) that provides a service for defining, dispatching, processing, and managing DLAD-based events. For example, DLAD-based events may include exceptions or anomalies discovered in collected data. In one exemplary implementation, each event causes the execution of a specific well-defined action or method of the DLAD specification. Generally, events are created when a DLAD engine determines, or another DLAD application determines based on DLAD data values, that one or more data calculations or tests have indicated that other network management device applications or operators need to be notified of potentially anomalous behavior. Events define an arbitrary action to be taken by the DLAD processor or a network management device.

A DLAD event and alert rule specification includes one or more conditions or occurrences that trigger the creation of an event as well as actions or methods and actions that are triggered when the event is created. Exemplary occurrences that trigger the DLAD event manager to create an event and/or event tags in accordance with one or more DLAD event and alert rule specifications include:

Performance data from a collected data value is out of bounds as defined by a threshold;
Performance data from a collected data values indicates a performance degradation (e.g., goes below a threshold value or shows decreasing values over a specified number of update cycles as specified in (6140));
One or more collected data are not available for more than a threshold amount of time;
Analysis prediction confidence interval exceeds a specified threshold;
Actual collected data values do not match predicted values (or predicted value range).
Actual collected data values include a pattern that is different from an expected pattern, for example by an expected pattern learned by a trained ML model and encoded in a rule.
Actual collected data values include a pattern that is not expected, for example a pattern that is not included in patterns learned by ML model trained on collected DLAD data from a particular network device.
Actual collected data values do not include an expected pattern of values.
Actual collected data values do not include indicators of an expected event.
Actual collected data values include one or more patterns of values or segments of patterns that are misordered in relation to an expected pattern or expected segment of a pattern.
The selected DLAD specification identifies collected data values outside of a predefined range or a "reasonable" range value (e.g. 150% CPU usage, −25% memory usage) as defined by one or more thresholds. These thresholds may predefined, or may be defined as part of a machine learning process described below.

Exemplary actions or methods that may be specified for event processing comprise one or more of the following exemplary actions:

Send notification using an external notification mechanism, e.g.: user interface popup, instant messaging, email, pager, and/or SMS;
Execute a predefined dynamic application;
Modify the state of a data store item;
Tag one or more data elements with an event tag;
Perform (or cause an NMS to perform) a directed discovery process for a device or component;
Communicate with a collector to resolve data availability issues;
Initiate fallback collected data source;
Select a portion of the current DLAD specification to be used in order to process the event;
Select a different DLAD specification or part of a DLAD specification (e.g. a specified executable code or application, with the same or different input sources). to provide additional DLAD data;
Instantiate (or cause to be instantiated) one or more workflows (note the workflow system is external to the system and is not illustrated or described for clarity); and
Trigger initiation of one or more predictive run back auto-configurations (RBAs), e.g., for proactive procurement decisions and proactive migrations of workloads, when one or more trigger conditions or events are indicative of issued that impact one or more services.

In a first exemplary implementation, the DLAD processor receives the required input data as processed input data from information collection applications that are part of the DLAD processing device. In a second exemplary implementation, the DLAD processor receives input data directly from an external remote collector network as described herein. In a third exemplary implementation, the DLAD processor receives the input data from one or more NMSs.

Without regard to source, the DLAD processor receives the collected data on an interface and processes the data according to one or more DLAD specification rules (6160) and specifications. The received data is passed to DLAD specifications that require it, or if a rule is present to instantiate a DLAD specification for additional processing. The DLAD processor (or one of its programs) then processes the collected data in order to generate updated DLAD data values, alerts, and DLAD events, and then stores and/or publishes the newly generated DLAD data values to a data store and generates any required (by specification) alerts, and DLAD events. Alternatively, the DLAD processor may cause one or more DLAD data values, alerts, and/or events to be published using various well known network publishing protocols, for example, FTP/SFTP, HTTP/SHTTP, LDAP, and TCP/IP. In another alternative exemplary implementation, the DLAD processor causes the generated DLAD data values to be communicated to one or both of network management device (2080) and remote collector (not shown) which, in some further exemplary implementations, further communicate the DLAD data values to one or more additional network measurement devices or other network management system components (not shown).

7.2.3 DLAD Specifications

DLAD specifications define how DLAD data is created, processed, stored, and published. The specification defines one or more of:

Differing polling frequencies;
Differing data types;
Differing types of monitored data, metadata, and configuration data information collection.
Differing analysis processing requirements;
Differing data publishing/data sharing requirements.

An exemplary DLAD specification defines the analysis component to be used for collecting operational data from one or more managed devices, and then specifies the parameters to be used for performing the analysis using a previously learned set of classification parameters. The analysis program identifies anomalous data points within a defined set of collected data that require further action by the DLAD processor. In an example, the DLAD specification defines a cluster analysis program, and parameterizes that program with a collected data specification, and cluster definitions data.

Note that a DLAD specification may define a plurality of analysis programs and analysis program parameterizations. If so defined, each analysis program is performed independently and in parallel. This is particularly useful if the underlying collected data is from different types of network devices, such as a router and a web service. Note that when a plurality of analysis programs are used, they operate completely independently, allowing the first analysis program to reach a first conclusion and the second analysis program to reach a second (possibly contradictory) conclusion.

Figure 3:
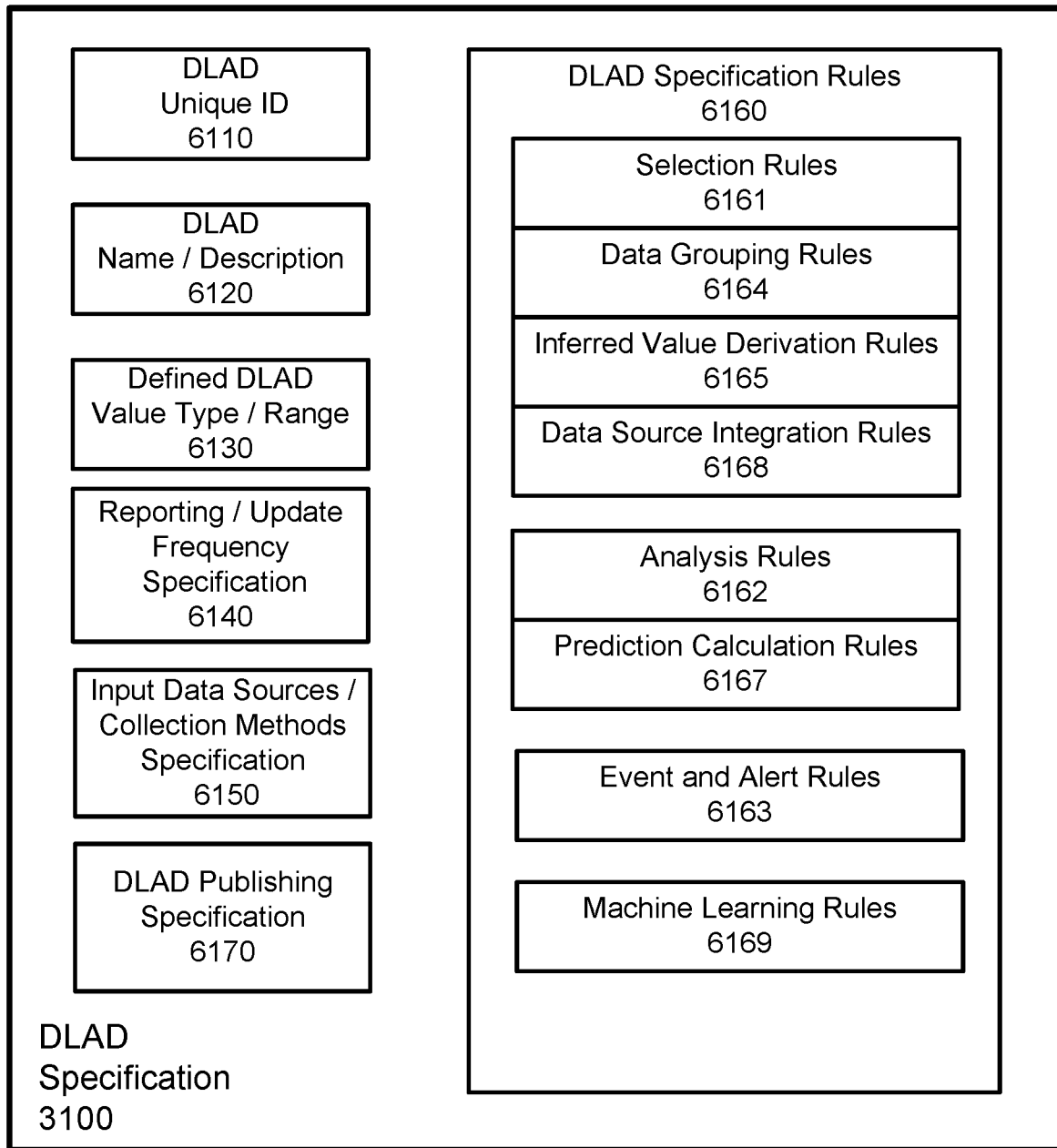
FIG. 3 depicts an exemplary DLAD specification and its subparts, in accordance with the illustrative technology herein.

Referring to FIG. 3, the system defines a DLAD specification (3100) comprising:

A DLAD unique ID (6110) is used by the system to uniquely identify individual DLAD specification instances.

A DLAD name and/or description (6120) provides user-readable name and description when integrating the DLAD specification into another system, such as a network management system.

A defined DLAD value type and range (6130) is used to facilitate publishing of the DLAD data values when integrating the DLAD specification into other systems, and when converting the DLAD data values as part of other NMS or NMD systems.

A reporting/update frequency (6140) defines the frequency at which the generated DLAD data value(s) are updated, and is used to limit overhead by applications that poll in order to collect DLAD data values.

Collected data sources and collection methods (6150) define the collected data used in the generation of the DLAD data values, including source and method of obtaining the data. These data source and collection methods define what and how data is collected. The system uses these specifications when matching against discovered data sources as described below. The data sources include direct sources, i.e. one or more sources of data that directly measure one or more data values associated with a hardware or software system or subsystem, and indirect sources that provide data values that have been previously calculated about one or more direct source values. For example, a direct source data value could be the value of CPU utilization for a specific processor, and an indirect source data value is the historical running average and standard deviation of the CPU utilization value. Multiple levels of indirection/sequential calculation may be used for indirect source values. The specification includes references to one or more types of data sources, including connection protocol specifications, references to executable code fragments or programs, and authentication materials that are used to connect to each defined data source.

A set of DLAD specification rules (6160) that define how the DLAD data are to be selected and *calculated from the collected data. The rules also define how collected data values from direct and indirect sources are analyzed to generate DLAD data values. The rules may take several forms, which are used independently or in combination.

A DLAD publishing specification (6170), comprising a specification for one or more data stores and/or interfaces to which DLAD data values, alerts, and events should be published.

Further, as described above, the DLAD specification rules (6160) has the following forms:

A first form of rule (6161) comprises selection rules that define how a plurality of data values from differing sources are selected for use. For example, most current, most accurate, etc. Alternative forms of these rules include selection by matching characteristics against one or more patterns or templates.

A second form of rule (6162) comprises rules that control how the DLAD processor performs data analysis on collected data. The format and content of these rules varies depending upon the type of analysis to be performed, but may include one or more of:

A) One or more portable definition of hyperparameters used to populate an trained model instance, B) One or more sets of encoded information extracted from an operating (source) machine learning instance in order to permit the recreation of a machine learning environment sufficient to continue machine learning activities in a new machine learning environment, C) One or more specifications that describe DATA dataset cluster specification parameters which, in some embodiments, are generated during a prior machine learning session sufficient to identify data membership in an identified data cluster. For example, one method of defining a cluster specification is to define a value for the center of the cluster and a cluster density or a distance from the center. Data that falls within the defined distance from the center of the cluster is determined might be considered "normal," and data that falls outside the defined distance from the center of the cluster is considered to be "anomalous." Other methods of parameterizing cluster specifications may also be used.

D) One or more normal pattern specifications which include learned operational patterns of behaviors or alerts (data patterns) associated with one or more DLAD data sets. In some embodiments, normal pattern specifications define data values as being inside or external to one or more cluster definitions, each associated with a discrete element of a pattern, e.g. with a particular data point in a group of data points that make up a pattern. This is similar to the dataset cluster parameters, but for operational behaviors (data patterns) instead of discrete data points.

E) One or more specifications of learned operational behaviors (data patterns) associated with one or more DLAD data sets characterizable as normal or anomalous operation, F) One or more specifications for learned patterns of DLAD data sets that identify missing, mis-ordered, or incomplete operational data collection, G) One or more specifications that direct a DLAD processor to one or more sources of extrinsic data such as network graphs and component relationship graphs that are usable by the DLAD processor to establish the basis for one or more data correlations.

H) One or more specifications for determining correlations between collected data and the behaviors of devices that generated the collected data. In some exemplary embodiments, these specifications are generated by a machine learning model trained on device behavior and corresponding data generated by a device.

A third form of rule (6163) comprises the rules and specifications that define event and alerting behavior of the DLAD processor. The event and alert rules define collected data and/or analysis, the types of events and/or alerts to be generated, actions to be taken such as starting a workflow and recording a workflow result, and threshold(s) for events, alerting, and workflow initiation (e.g. specification of a minimum confidence that behavior is anomalous required prior to triggering an event, alert, and/or initiation of a workflow). Exemplary event and alert triggers are listed include:

A) Performance data from a collected data value is out of bounds as defined by a threshold;

B) Performance data from a collected data values indicates a performance degradation (e.g., goes below a threshold value or shows decreasing values over a specified number of update cycles as specified in (6140));

C) One or more collected data are not available for more than a threshold amount of time;

D) Analysis prediction confidence interval exceeds a specified threshold;

E) Actual collected data values do not match predicted values (or predicted value range).

F) Actual collected data values include a pattern that is different from an expected pattern, for example by an expected pattern learned by a trained ML model and encoded in a rule.

G) Actual collected data values include a pattern that is not expected, for example a pattern that is not included in patterns learned by ML model trained on collected DLAD data from a particular network device.

H) Actual collected data values do not include an expected pattern of values.

I) Actual collected data values do not include indicators of an expected event.

J) Actual collected data values include one or more patterns of values or segments of patterns that are misordered in relation to an expected pattern or expected segment of a pattern.

K) Actual collected data values include one or more indications that behavior of one or more devices may be correlated with, affected by, or otherwise related to behavior of one or more other devices. An event and alert rule that includes a trigger of this type may further include one or more specifications that direct a DLAD processor to perform additional discovery to discover additional aspects of a possible relationship that may be inferred based on other information, including specification of one or more workflows for DLAD processor or NSM to undertake for discover of further information to identify hidden topology information, e.g. initiate discovery parameterized by the one or more devices from which data that triggered execution of the rule was collected. In an exemplary implementation, a DLAD processor determines that the processor load on a monitored web service increases at the same time as the processor load on a second web service. An event and alerting rule directs the DLAD processor to initiate further discovery of the monitored web service and/or second web service including communication connections therebetween.

A fourth form of rule (6164) comprises data grouping rules and specifications that define how selected data values are combined and/or aggregated; for example, grouped into time series bins of five minute intervals, groups by data source device type or classifications, etc. Data weighting is also specified in this rule, and is based on factors such as collection protocol, frequency of collection, and last collection time.

A fifth form of rule (6165) comprises rules and specifications for deriving inferred DLAD data values and data value relationships from other values, data values or DLAD data values. The inferred DLAD data value are an estimate of a value of a parameter measured by a direct source that is inferred from a value of another data value that is measured by an indirect source. This form of rule references one or more executable programs or program fragments that implement the DLAD data value calculations.

A seventh form of rule (6167) comprises rules and specifications that define how predictions are calculated. As an example, a prediction calculation rule produces a projected time series of values based upon one or more algorithms and/or one or more trained machine learning models, and provides these projected values over time. This form of rule references one or more executable programs or program fragments that implement the DLAD data value calculations. Projected values are useful for calculating trends in utilization, and for making predictions about the future state of a device.

An eighth form of rule (6168) comprises rules and specifications that define one or more of: data sources to be used, how data sources are to be used, how the data sources are to be integrated with the system, protocol specification for accessing the data sources, authentication materials that grant access to the data sources, and the data types and elements that are obtainable from the data source.

A ninth form of rule (6169) comprises machine learning rules that are used in a machine learning environment to learn relationships between data sources and their associated data values and create new or modified rules that support these learnings. The machine learning rules include encoded parameters and/or encoded hyperparameters, as well as references to specific machine learning algorithms. In this way, the results of training are passed between DLAD processor instances, and specifically from a training instance to an instance that is solely using a pre-trained model. The created rules are added to one or more existing DLAD specifications, and/or are used to create new DLAD specifications. For example, a machine learning rule operates on data collected from a plurality of multiple data sources and learns one or more relationships between the data elements collected from direct sources and encodes the results of those learnings within one or more DLAD specification rules.

The DLAD specification optionally defines the operation of the MM-ML-processor ML algorithm competition and selected processing though a series of parameters. These parameters comprise:

Number of searches to run (e.g. minimum and maximum number of searching to run)

Search CPU/resource utilization (e.g., amount of CPU [or other resource] to use for searching)

Type of search (e.g. monte-carlo style, grid, gradient)

Parameters to searches (e.g. variance to use for parameters to a search, % of search space to cover)

Search program references (references to one or more search programs)

Scoring benchmark program reference (references to one or more results benchmarking programs)

Selection criteria for selecting ML algorithms (e.g. metric ranking, tolerance for false positives, tolerance for false negatives)

Other definitions may be added to the DLAD specification with deviating from the intent of the invention.

Other forms of rules and specifications may be incorporated into the above DLAD specifications without deviating from the scope of the invention. For example, one or more specifications may be defined that include executable code fragments, that reference executable code fragments, or that reference well known executable programs or dynamic applications that are to be used by the DLAD processor for further processing. These rules and specifications may further define one or more execution conditions, which are the conditions under which a specific application, dynamic application, or code fragment is executed. In this way, the DLAD specification are optimized for delivery by only including the portions of the application code that are needed on a specific DLAD processor or DLAD-enabled device.

A DLAD specification further comprises optional specifications that define when, where, or under what conditions the DLAD specification is instantiated (e.g. a DLAD instantiation condition). These conditions are used by a DLAD processor in order to determine if a specific DLAD specification may be instantiated on that DLAD processor.

In an embodiment, the DLAD specification includes rules that define one or more DLAD events, the event triggering conditions, event dispatch specifications, and event handling specifications. Event triggering conditions are the conditions which cause an event to be generated by the DLAD processor, and are typically evaluated and determined by a program of a DLAD processor. Event dispatch specifications define how an event is handled by the DLAD processor, and which components (or external systems) receive the event. Event handling specifications define how a DLAD processor uses one or more specified programs to process a received event.

7.2.4 Distribution Formats

The DLAD specifications are typically implemented using a markup language such as XML, or a combination of a markup language and one or more pieces of encoded binary blocks, and/or references to executable programs that implement the necessary processing logic. DLAD specifications may be implemented in one or more formats depending upon the requirement of the targeted DLAD processing environment without deviating from the scope of the invention; for example, as stand-alone applications, plug-ins for other programs, libraries, binary objects, etc.

Figure 4:
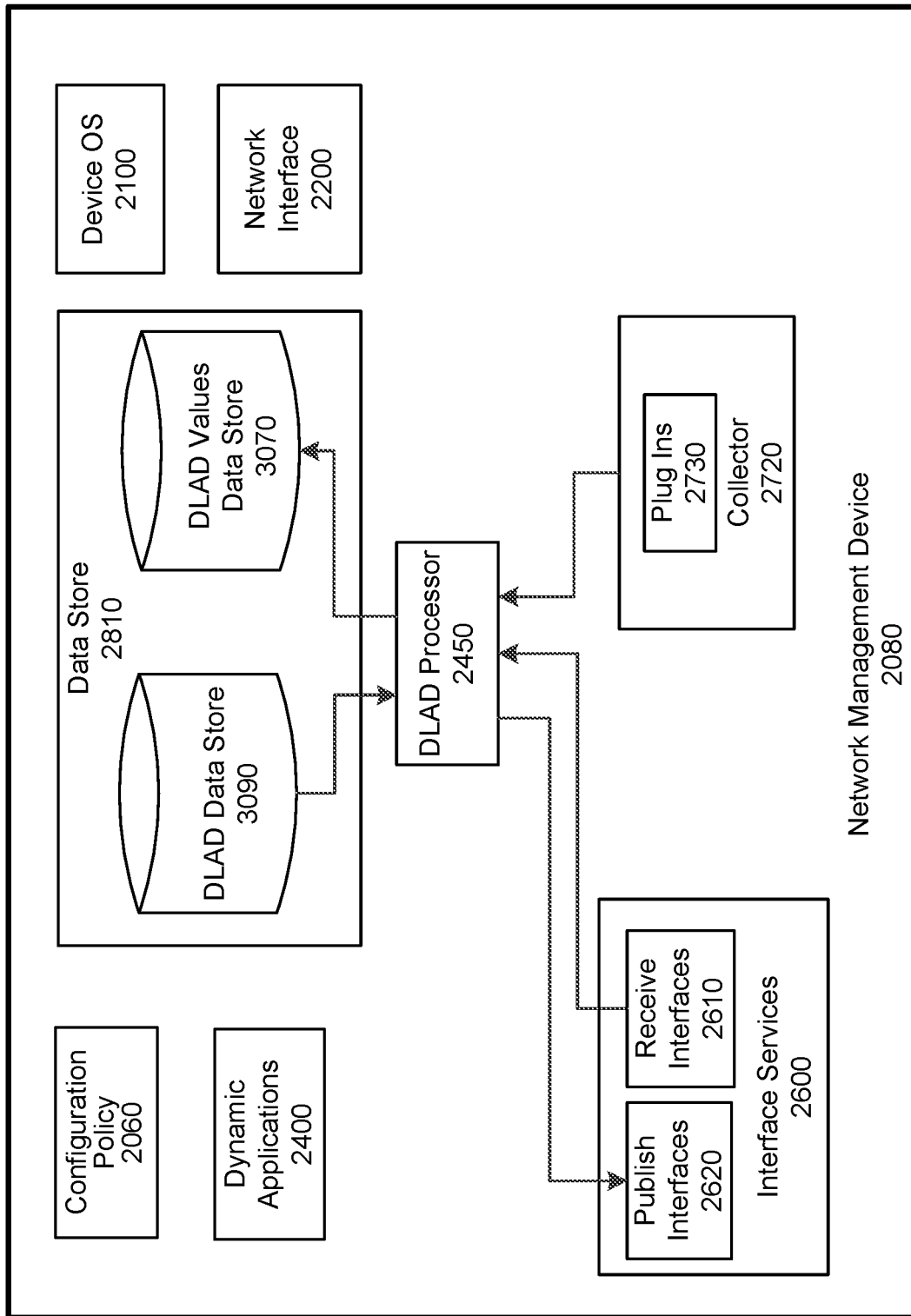
FIG. 4 depicts an exemplary network management device including a DLAD processor and other components in accordance with the illustrative technology described herein.

In a first exemplary format, as illustrated in FIGS. 2 and 4, DLAD specifications are deployed as part of dynamic applications (2400) that each include at least one DLAD specification (e.g. 3100a, 3100b) and one or more programs that are executed to perform one or more aspects of the DLAD data collection, analysis, or publishing processes. In a second exemplary format, and DLAD specifications are implemented within virtualized applications running on a virtual service guest operating system that includes a virtualized NMD. In a third exemplary format, DLAD specifications are implemented as part of individual programs that are executed inside lightweight software-defined virtualized container environments as described above. In a fourth exemplary format, the DLAD specifications are implemented as unique XML data structures, and are included by reference within any of the described implementation approaches.

7.2.5 DLAD-Enabled Network Management Device

DLAD processing may be added to existing network management devices in order to improve their processing capabilities. As depicted in FIG. 4, an exemplary network management device (2080) is configured to use DLAD specifications that define its operation and to generate DLAD data values. The network management device (2080) is deployed stand-alone, or as part of a set of management device instances. For example, a management device instance may be deployed as a stand-alone management device appliance, in which at least one management device component is deployed operating within a network appliance, may be installed as server software installed on extant servers, or as virtualized instances of the management device.

Interface services (2600) of a network management device (2080) provide application service-level interfaces for publishing (2620) and receiving (2610) information in various standard formats. The interface services applications provide input and output using well-known protocols.

Collector (2720) downloads, and executes one or more collector plug-in dynamic applications (2730) in order to process collected data. The collector plug-ins processes data values received from the receive interfaces and passes the collected data to one or more dynamic applications (2400), one or more data stores (e.g., 3070, 3090), a publish interface (2620), and/or to the DLAD processor (2450). Exemplar collector plug-ins comprise, for example, a services based collector plug in like a DNS collector plug-in, SMTP collector plug-in, SNMP collector plug-in, or a database collector plug-in and/or hardware based collector plugins such as a network interface collector plug-in, an IEEE 488 collector plug-in, and/or a dedicated bus collector plug-in.

A configuration policy (2060) specifies which DLAD specifications and dynamic applications are eligible to operate on a particular NMD. For example, the configuration policy specifies which DLAD specifications are to be used by a DLAD processor of the NMD. The configuration policy also specifies which dynamic applications are to be used by the collector (2720) in response to a DLAD processor request for specific data types.

The DLAD processor (2450) interacts with the collector (2720), for example with a classifier component of the collector, to inform the collector that specific data is required by the DLAD processor. For example, the DLAD processor informs the collector that it requires VM CPU usage and virtual machine CPU and memory usage data. The collector determines if one or more plug-ins (2730) are collecting the data requested by the DLAD processor, and if so, passes data collected by the plug-ins to the DLAD processor.

In some exemplary implementations, the collector determines that data it has collected should be passed to a DLAD processor. For example, the collector includes a classifier plug-in that is configured to recognize collected data and to determine that the collected data should be passed to the DLAD processor. Similarly, the DLAD processor creates additional classifier plugins to identify anomalous or unpredicted data. The classifier plug-in recognizes one or more patterns of collected data that match a DLAD specification instantiation condition and cause the DLAD processor (for example, using an event) to instantiate and/or execute one or more DLAD specification and/or dynamic applications. For example, the classifier recognizes that a direct source of a performance metric has stopped providing data or is performing anomalously. The classifier then causes the DLAD processor to execute one or more programs identified or contained within a DLAD specification in order to address the identified anomaly and restore the collected data feed.

In an exemplary implementation, DLAD specifications are delivered to the network management device as part of one or more DLAD dynamic applications (2400). The network management system downloads one or more DLAD dynamic applications (and/or DLAD specifications) and stores them in a data store (e.g. the DLAD data store (3090)). DLAD dynamic applications are instantiated, executed, and updated under control of the configuration policy. Alternatively, DLAD specifications are delivered to a network management device independently of the DLAD dynamic applications, and are combined with the dynamic applications within the network management device and/or DLAD processor.

A DLAD processor instantiates one or more DLAD specifications by loading the DLAD specification(s) (either in DLAD specification form, or as part of a DLAD dynamic application) from a data store, configuring the collection of data as specified by at least one DLAD specification, configuring the execution environment and data stores required by the DLAD dynamic application, and configuring the storage and publishing of the resulting DLAD data values.

The DLAD processor (2450) executes one or more DLAD dynamic application(s) (2400) in order to process received information so as to generate one or more DLAD data values. In some embodiments, a DLAD processor instantiates and then executes a DLAD dynamic application. In various exemplary implementations, the DLAD processor executes one or more DLAD dynamic applications automatically at startup, periodically on the basis of a timer, by receiving a direct execution request from a collector, or as the result of using a DLAD specification.

7.2.6 DLAD Processor with Machine Learning

Figure 5:
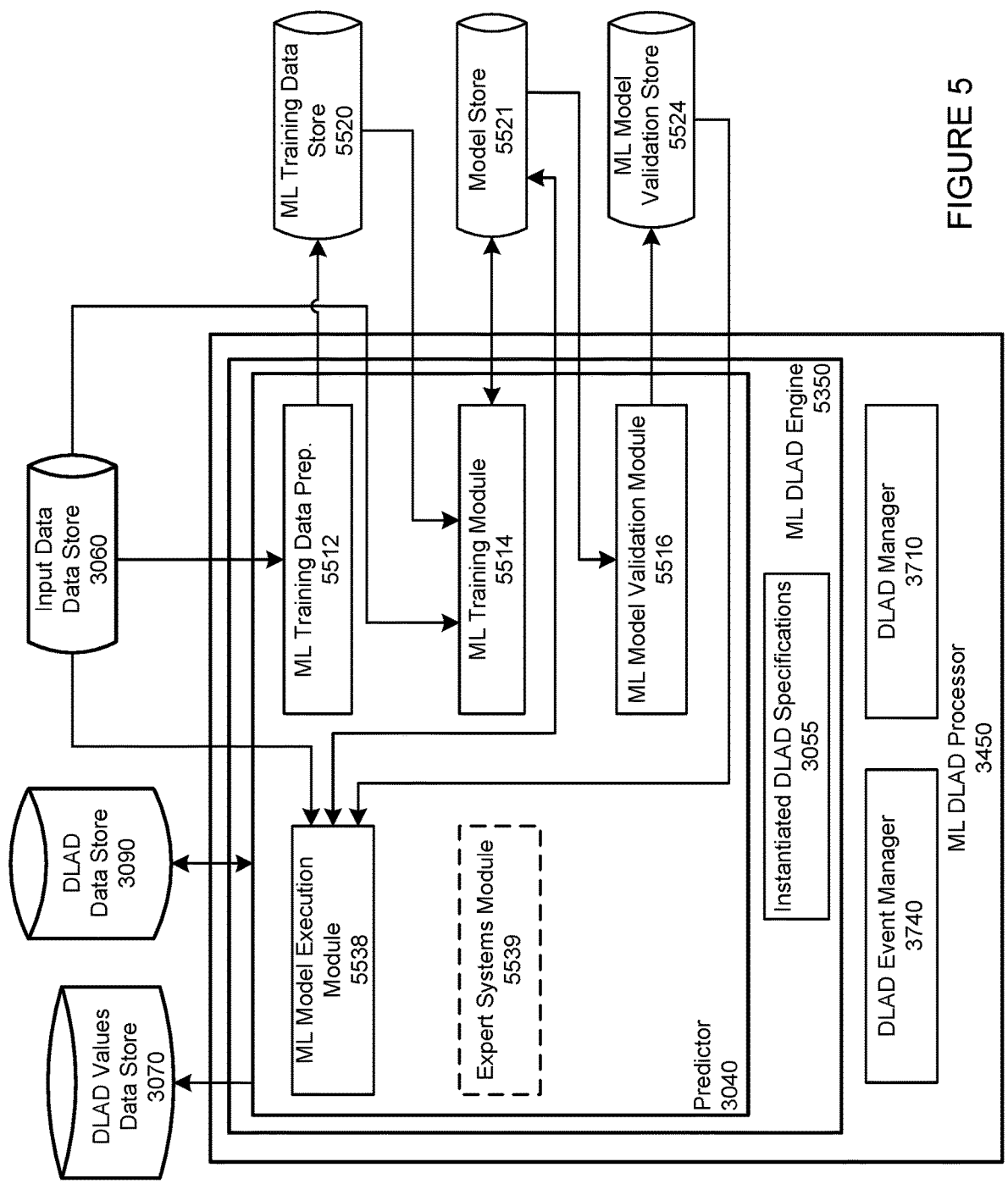
FIG. 5 depicts an exemplary machine learning DLAD processor for processing DLAD specifications including machine learning rules, in accordance with the illustrative technology herein.

As depicted in FIG. 5, an exemplary embodiment of a machine learning-enabled DLAD processor (ML-DLAD) (3450) is configured to generate and refine DLAD data values using one or more machine learning models. The ML-DLAD processor executes one or more trained machine learning rules (6169) in order to produce new or refined DLAD data values, DLAD specifications, and DLAD parameterizations.

In this exemplary implementation, the ML-DLAD processor (3450) contains a ML DLAD engine (5350) which further comprises predictor (3040) with machine learning model execution program (5538) that executes a trained machine learning model using ML model data to generate ML model output data (e.g. predictions, estimates, or forecasts). ML model data comprises one or more of historical training data, current collected data, configuration data, metadata and other external data, for example from non-IT asset data sources. The ML-DLAD processor reports generated ML model output data as DLAD data values, specifications, events, or alerts.

In an exemplary implementation, one or more instantiated DLAD specifications (3055) further comprise one or more machine learning rule(s) (6169) that specify a type of machine learning model or a specific machine learning model for the ML-DLAD processor to use. The ML-DLAD processor queries a model store (5521), model validation store (5524), and/or an independent model registry for one or more specified ML model(s) and any parameterizing hyperparameters, and loads the selected models and their hyperparameters into the ML model execution program (5538). The ML component of the DLAD processor comprises one or more ML model execution program (i.e. 5538a, 5538b, etc. (not shown)) which can each be configured to execute using a particular trained ML model.

The ML-DLAD processor determines input data for the machine learning model, for example by querying the DLAD specification specified data sources/collection methods specification (6150). The ML-DLAD processor receives and processes machine learning model input data directly from a data source such as an external collector (2720) and/or one or more additional data sources, for example from network data store (4300) or third party data source (4200), and then uses the input data to train machine learning models and to perform data generation executions of machine learning models.

In a first exemplary embodiment, the ML-DLAD processor controls the ML model execution program (5538) to execute a ML model that has been trained to recognize whether or not collected DLAD data corresponds to one or more "normal" data clusters. The trained ML model processes collected DLAD data to determine if the collected data falls inside the boundaries of one or more clusters and generates an output that includes an indication of collected DLAD data values that do not fall inside the boundaries of one or more clusters. The DLAD event manager (3740) receives the output from the trained ML model and may determine that the collected DLAD data values that do not fall within a boundary cluster are anomalous.

In a second exemplary embodiment, the ML-DLAD processor controls the ML model execution program (5538) to execute an ML model that has been trained to recognize expected patterns or events, deviations therefrom, or an absence thereof in collected DLAD data. The trained ML model processes collected DLAD data to determine whether an expected pattern or event is present when not expected, missing when expected, or broken (e.g., altered or misordered in comparison to an expected pattern) and produces an output that indicates what, if any, collected DLAD data values correspond to unexpected, missing, or broken patterns. The DLAD event manager (3740) receives the output of the trained ML model and may determine that collected DLAD data values that correspond to unexpected, missing, or broken patterns are anomalous.

In a third exemplary embodiment, the ML-DLAD processor controls the ML model execution program (5538) to execute the ML model, using ingested or retrieved input data, to produce inferred or predicted DLAD data values, for example a predicted vCPU usage value, as ML output. The ML model execution module then associates a quality or certainty metric, retrieved from the ML model validation store (5524), with the ML model output. The ML model execution program generates, based on predicted DLAD values and the quality or uncertainty metric, upper and lower bounds for predicted DLAD values. The ML component of the ML-DLAD processor publishes and/or saves the ML model output as a predicted DLAD data value having upper and lower bounds. The DLAD event manager (3740) compares a collected DLAD data value to the predicted upper and lower bounds and determines that the DLAD data value is anomalous if it falls outside of the predicted upper and lower bounds.

Additional aspects of the ML-DLAD processor (3450) are programs that train, validate, update, and store the machine learning models that are used by the ML program. ML training data preparation program (5512) performs operations to process and format input data to generate ML training data that can be used to train ML models. ML training program (5514) uses the ML training data to train ML models, thereby generating trained ML models. The ML training program re-trains or updates the training of ML models as the system collects additional data and produces additional estimates, predictions, and forecasts. ML model validation program (5516) performs validation testing on trained ML models to generate one or more metrics that can indicate accuracy of predictions generated by the trained models.

The machine learning (ML) training data preparation program (5512) retrieves input data from one or more of the input data sources and/or data stores (e.g. data store 3060), via the collector (2720), and receive interfaces (2610). The ML training data preparation program processes the retrieved data to generate machine learning model training, validation, and testing data formatted as a data frame suitable for use in training one or more ML models. Processing of the retrieved data includes cleaning the data to remove outliers, interpolating or otherwise filling in missing data points, and removing erroneous or otherwise unneeded data and formatting the data in a date frame. In some embodiments, one or more of these data cleaning operations are carried out by one or more collector plug-ins (2730) prior to the data being written to a data store. In other embodiments, the data cleaning operations are carried out after the data has been written to a data store. The ML training data preparation program (5512) generates and pushes, or otherwise make available, filters usable by the collector plug-ins to perform data cleaning and formatting operations. The ML training data preparation program generates training data useful for initial training of a machine learning model and training data useful for retraining or updating a previously trained machine learning model. The ML training data preparation program stores ML training, testing, and validation data in ML training data store (5520).

In an embodiment, the ML model store comprises dynamic applications that implement algorithms from commercially available ML toolkits (either internally to the dynamic application, or by reference to one or more external programs) as well as custom algorithms and models. Some examples of types of predictive models include (without limitation) regression models (e.g., linear regression, logistic regression), neural network models parameterized by one or more hyperparameters from a DLAD specification, classification and regression tree models, multivariate adaptive regression spline models and other machine learning models (e.g., Naïve Bayes, k-nearest neighbors, Support Vector Machines, Perceptron).

The ML training program (5514) retrieves an untrained, partially trained, or previously trained ML model from the ML model store (5521) or from an DLAD specification, retrieves ML training data from the ML training data store (5520), and uses the training data to train or retrain the ML model, thereby generating a locally trained ML model, which it then stores in a data store, e.g. the ML model store (5521) or the model registry.

The ML training program also operates to directly retrieve newly collected data corresponding to features of a trained or untrained ML model from a data store, and the ML training program uses this newly collected data to incrementally improve the training of a trained model as the newly collected data becomes available. The re-trained or updated ML model is stored in the ML model store.

The ML training program also executes a trained ML model to generate and update rules, including rules usable by an external program such as a complex events processing (CEP) program (show shown) and DLAD specifications defining aspects of one or more trained ML models and/or results of processing these models. These updates are encoded within one or more DLAD specification rules (6160), and are then stored in a data store such as the ML model store.

In a first exemplary embodiment, the ML training program executes a trained ML model to generate one or more one or more "normal" data cluster specifications. The cluster specifications are encoded into one or more cluster-based DLAD specification analysis rules and/or DLAD prediction calculation rules.

In a second exemplary embodiment, the ML training program executes a trained ML model to generate one or more patterns of expected data and/or event patterns. The normal data and/or event patterns are encoded into one or more pattern-based DLAD specification analysis rules and/or DLAD prediction calculation rules. The cluster-based and pattern-based DLAD specification analysis rules and/or DLAD prediction calculation rules are used by the DLAD processor to determine whether collected DLAD data values are anomalous or normal.

The ML model validation program (5516) retrieves a trained ML model from a data store (e.g. the ML model store (5521)), retrieves evaluation data (i.e. testing and validation data) from the ML training data store (5520), and performs testing and validation operations using the trained model and the retrieved testing and validation data. The ML validation program then generates a quality metric, e.g., a model accuracy or performance metric such as variance, mean standard error, receiver operating characteristic (ROC) curve, or precision-recall (PR) curve, associated with the trained ML model. The ML model validation model generates the quality metric by executing the model and comparing predictions generated by the model to observed outcomes. The ML model validation program stores model quality metrics in a data store (e.g. the ML model validation store (5524), or the ML model store (5521)) associated with the trained ML model.

The ML model validation program periodically tests trained ML models using training data derived from collected observation data and recalculates the quality metrics associated with each of the trained ML models. Trained ML models are retrained by the ML training program (5514) if the system determines that associated quality metrics have deteriorated below a threshold amount. Trained ML models also are retrained on a periodic schedule.

After retraining, the updated metric scores are ranked and used to determine and select the "optimum" trained model for each set of data values, and the association between the set of data values and the selected trained model is stored in a data store. Updated hyperparameter data sets are similarly extracted from the selected trained model and are stored in a data store.

In some exemplary implementations, the ML-DLAD processor further comprises an optional expert systems program (5539) is a program that processes input data using expert systems methods such as complex events processing (CEP) to generate expert systems output data. The expert systems program retrieves data processing rules from a DLAD specification (e.g. from model store (5521)), retrieves input data from one or more data stores (e.g. data stores 3070, 3090), and uses the rules in the specification to process the input data. In an example embodiment, the expert systems program performs complex event processing (CEP) using the retrieved rules to recognize events and patterns. The expert system program is configured to generate alerts and otherwise communicate results generated by the program to other system processes.

7.3 Creating and Publishing DLAD Specifications

The system creates, stores, and distributes specifications for creating DLAD specifications (3100a-3100n) and the processing attributes that comprise individual DLAD specification rules (6160a-6160n).

In one embodiment, a data store includes one or more DLAD specifications, each DLAD specification comprising one or more DLAD specification rules. The DLAD specifications are indexed by identifiers associated with network devices, for example by device type, manufacturer, other device attributes or sets of attributes, and/or relationships between devices. Alternatively, DLAD specifications may be indexed based on workloads and behaviors of network devices. These alternative indexing schemes permit a DLAD specification to be automatically associated with newly discovered network devices.

A DLAD processor may be configured manually to operate using a particular set of DLAD specifications. The DLAD specifications for a specific DLAD processor are defined in a configuration policy associated with that DLAD processor.

A DLAD specification also is automatically configured to operate when it matches one or more attributes of a network device discovered by an NMD. When a network device is newly connected to a network, the NMD performs device discovery using pre-integrated and dynamic applications to determine attributes of the device, workload and behaviors of the device, and device relationships. As part of the NMD auto-discovery processing, the NMD matches these attributes against the attributes associated with one or more DLAD dynamic applications, and executes the associated dynamic application(s) as required. In an embodiment, the DLAD processor searches one or more data stores for the DLAD dynamic applications matching the desired attributes, such as data type processed or discovered network device type. If matching DLAD dynamic application(s) are found, the DLAD processor instantiates (if required) and executes the identified DLAD dynamic application(s) and associated rules and DLAD specifications.

If the DLAD processor does not find a DLAD specification corresponding to the network device in the searched data store, the system generates a new DLAD specification, associates it with the device, and saves (publishes) the new DLAD specification to a specified data store.

7.3.1 Example DLAD Specification Creation

DLAD specifications are created in conjunction with the output of trained models, as described above, or may be created external to the DLAD processing arrangement and imported (such as by an external machine learning system that is producing pro-forma trained models for specific network devices). As defined above, DLAD specifications include trained model definitions and hyperparameter objects, which are collections of one or more hyperparameters (e.g. a hyperparameter data set) extracted from a training system in portable form. Alternatively, the hyperparameter data set is extracted and stored after a model is retrained on the destination system, in which case the hyperparameter data set represents a locally trained hyperparameter data set. In either case, the DLAD specifications, including hyperparameter data sets, are created by:

A) extracting the hyperparameters from a machine learning model,
B) encoding the hyperparameters in a portable format, such as a base64 encoding within a DLAD specification,
C) identifying the network connected devices types and/or collected data types the hyperparameters should be applied to,
D) encoding the network connected device types and/or data types within a DLAD specification associated with the encoded hyperparameters,
E) storing the DLAD specification to a data store

Figure 6:
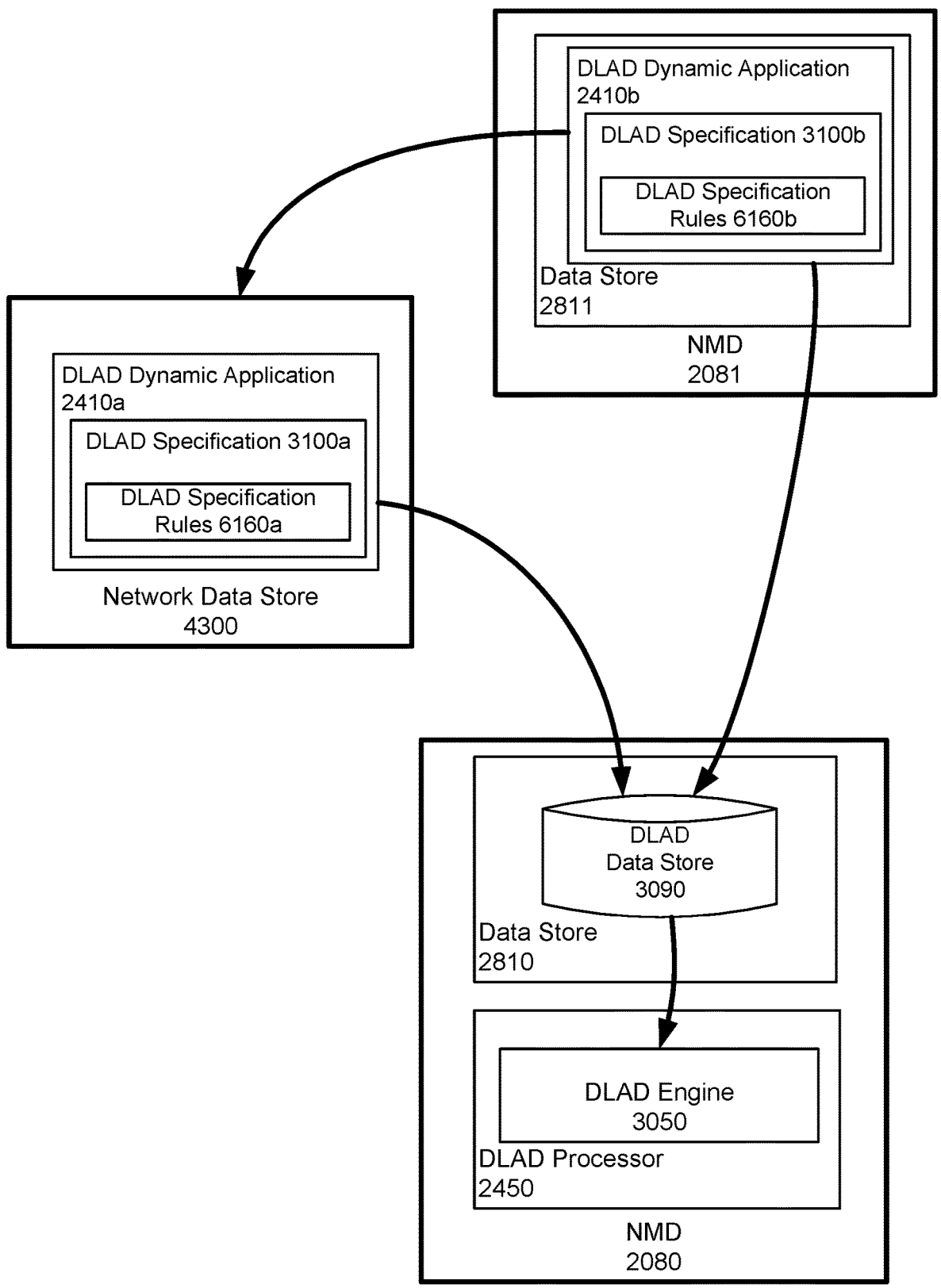
FIG. 6 depicts an exemplary network management system for distributing DLAD specifications, in accordance with the illustrative technology herein.

7.3.2 Example Distribution of DLAD Specifications and DLAD Dynamic Applications DLAD specifications and DLAD dynamic applications are deployed in the context of a network management system (NMS) that is configured to discover and characterize components of one or more computer networks and to collect information, including performance data, about the discovered network components. The network management system includes one or more network management devices (NMDs) similar to (2080), each configured to detect and monitor network components. As depicted in FIG. 6, a network management system comprises a first network management device (2080), a second network management device (2081), and a network data store (4300). The first network management device (2080) further comprises a DLAD processor (2450) that is configured to use one or more DLAD specifications in conjunction with one or more programs in order to generate DLAD data values. The DLAD processor instantiates one or more DLAD specifications from a data store (e.g. a DLAD data store (3090)), and executes any specified programs on DLAD engine (3050) in order to generate one or more DLAD data value(s). The first network management device stores the generated DLAD data values in a data store (not shown in figure).

DLAD specifications and DLAD dynamic applications are included with other network management device software at installation time, or are downloaded from one or more sources and added to the network management device and/or are updated at a later time. For example, in one exemplary implementation, the first network management device (2080) downloads DLAD dynamic application (2410a), which further comprises a DLAD specification (3100a) including DLAD specification rules (6160a) from a data store.

DLAD-enabled network management devices provide DLAD data and configuration information to other network management devices directly or indirectly by storing DLAD data values, DLAD specifications, and DLAD dynamic applications to network data stores where they are accessible to other network management devices.

In a first exemplary implementation, a second network management device (2081) stores DLAD dynamic application (2410b), including DLAD specification (3100b) and DLAD specification rules (6160b), in a data store (2811) which is replicated to the first network management device (2080). In a second exemplary implementation, DLAD specifications are exported from the second network management device in "normal" form and are manually moved to the first network management device, where they are imported by the first network management device. In a third exemplary implementation, the second network management device (2081) publishes DLAD data values directly to the first network management device (2080) or to a data store, from which they are downloaded by the first network management device.

Figure 7:
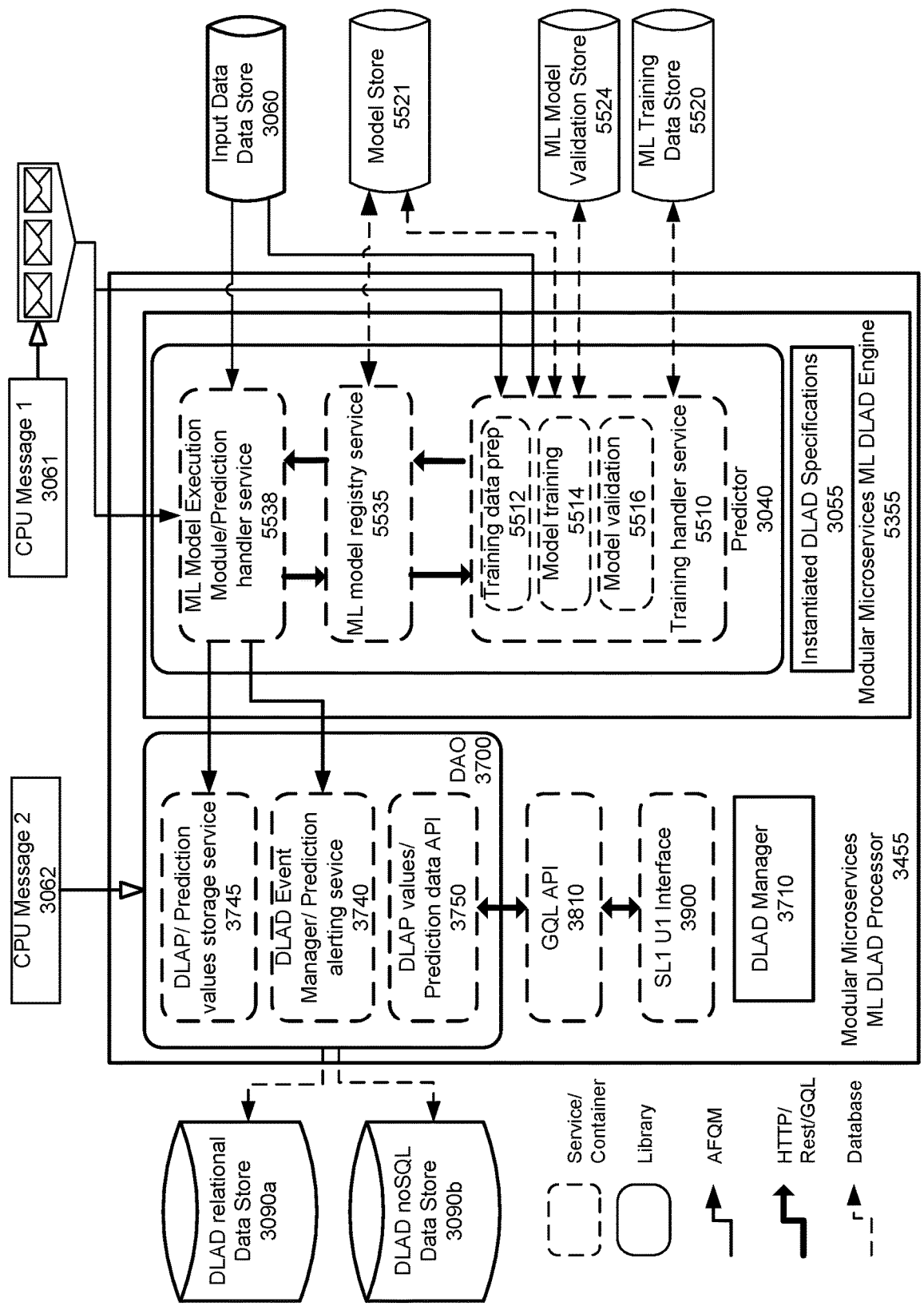
FIG. 7 depicts example non-limiting prediction processing.

7.3.3 Example DLAD Processor with Modular Microservices and Machine Learning As depicted in FIG. 7, an exemplary embodiment of a modular microservices (MM) machine learning-enabled (ML) DLAD processor (MM-ML-DLAD processor) (3455) is configured to generate and refine DLAD data values using one or more machine learning models. MM-ML-DLAD processor (3455) comprises programs, structures, and functionalities similar to those of ML-DLAD processor (3450), illustrated in FIG. 6, with one or more, and preferably all, programs, services, and APIs provided as containerized applications. Referring to FIG. 1, the containerized application programs are run on a container engine (2175) that operates on Device OS (2100) of a DLAD processing device that includes a MM-ML-DLAD processor (3455).

Predictor (3040) comprises services for training, rank selecting, and executing one or more machine learning models. In an exemplary embodiment, the one or more machine learning models include third party or open source ML models such as TensorFlow models and algorithms in custom Docker containers. The modular microservices architecture of MM-ML-DLAD processor (3455) is operable for the plug-and-play of different prediction algorithms, and/or differently parameterized versions of the same prediction algorithm such that a one or more ML model can be executed to generate predicted DLAD values for each of multiple network devices, or even for multiple collected data values from a single network device. Multiple models may be executed, the results compared and scored, and a ranking metric assigned to each model. In this manner, the MM-ML-DLAD processor ranks, selects and trains a best ML algorithm for making predictions for a particular network device or for groups of network devices, or even individual data elements from a network device. The "best" or optimal ranked ML algorithm and parameters is then configured for use by the system by adjusting the system's configuration and storing the updated configuration.

In an embodiment, the MM-ML-DLAD processor determines the algorithms to "compete" based upon information encoded within a DLAD specification, and then parameterizes each instance of the ML algorithm as defined by the specification. Thus, different instances of the same algorithm differing only in their parameterization, or different algorithms provided by distinct executable programs, parameterized by one or more parameters and/or hyperparameters as determined in accordance with at least one DLAD specification, are executed against a defined data set. The results of the execution (e.g. generated DLAD data values) are scored in accordance with the scoring program defined in a DLAD specification, and a single metric for each ML program execution is calculated by the MM-ML-DLAD processor. The MM-ML-DLAD processor then selects the "winning" ML algorithm/parameters in accordance with the selection criteria defined in a DLAD specification. In an embodiment, the DLAD processor does not necessarily search for a "best" or optimal ML algorithm and associated parameters, but may select a suitable ML algorithm and associated parameters for use.

Predictor (3040) further comprises a training handler service (5510) that performs functionalities of, or that includes a containerized instance of each of ML training data preparation program (5512), ML training program (5514), and ML model validation program (5516), each of which perform functions substantially as described in relation to ML-DLAD processor (3450). The training handler service (5510) creates one or more containerized trained ML models and stores the trained ML model containers in a data store (e.g. model store (5521)).

Predictor (3040) further comprises ML model execution program (5538) which is provided as a containerized prediction handler service. ML model registry service (5535) determines one or more trained ML model(s) to be used by the prediction handler service for making predictions, and then retrieves from a data store one or more container(s) that implement the determined trained ML models. In example contexts, the "predictions" are not of a type a human mind could develop at least because (a) even with the aid of instrumentation, a human could not analyze microindicators of network traffic/behavior to a necessary degree to predict future network traffic/behavior, and/or (b) the operations and analysis performed based on the ML model(s) may be unknown/unknowable to a human, and/or (c) the analysis is conducted more rapidly based on a much larger quantity of data than a human mind can realistically process in time to adapt the network to potentially rapidly changing network conditions. Example advantages of performing such prediction with a high performance processor such as a GPU based on an ML model include for example automatic, rapidly self-adapting network fault detection and self-healing. The retrieved model containers are provided to the predication handler server for execution. The prediction handler service executes the container and receives as input collected DLAD data values directly from a CPU, e.g., as CPU message type 1 (3061), or from an input data data store (3060). The prediction handler service processes the collected DLAD data values using the selected trained ML model to generate predicted DLAD data values, which it provides to one or more services of data access objects (DAO) (3700).

DOA (3700) includes DLAD event manager (3740), provided as a prediction alerting service, which compares predicted DLAD data values to predefined event thresholds and generates alerts based on the threshold comparison. DAO (3700) also includes predicted DLAP values storage service (3745) which formats predicted DLAP data values for storage and provides the formatted data values to one or more external data stores.

7.3.3.1 Example Prediction Handling by DLAD Processor with Modular Microservices and Machine Learning FIG. 7 shows example non-limiting prediction handling processing carried out by MM-ML-DLAD processor (3455). In the example shown, a CPU generates CPU messages of type 1 (3061) which include parameters such as:
schema_key,
entity type-xtype,
entity id—xid,
collection time,
collection rate,
d_overall_cpu.

Predictor (3040) is implemented using a known machine learning technology (such as a deep neural network parameterized by one or more hyperparameters from a DLAD specification executing on a multi-processor GPU including deep learning hardware acceleration (see for example Goodfellow et al, "Deep Learning" MIT Press 2016) including the following components:

prediction handler (5538),
model store (aka model registry) (5535), and
training handler (5510).

The prediction handler (5538) receives CPU messages of type 1 (3061), extracts collected DLAD data values including CPU usage data from the CPU messages, and processes CPU data to provide predicted DLAD data values, which include a prediction of CPU usage. The predicted DLAD data values are messaged to prediction alerting service (3740) and prediction storage service (3745). The prediction handler service (5538) is supported by model registry service (5535) which provides machine learning models trained using training handler service (5510). The prediction alerting and prediction storage services can also be messaged directly from the CPU with CPU message of type 2 (3062) which each include, for example:
schema_key,
entity type-xtype,
entity id—xid,
collection time,
prediction_time,
prediction,
prediction_min,
prediction_max, The prediction storage and prediction alerting services interface with one or more data stores, for example, a relational databases/libraries (3090*a*) and/or one or more DLAD NoSQL databases/libraries (3090*b*). The prediction storage and prediction alerting services are also accessed via a prediction data API (3750), a GQL API (3810) and/or a network discovery and management device (e.g., referring to FIG. 1, NMD (2080)), via SL1 U1 interface (3900)). The network discovery and management system uses the results of the predictor to discover information about the network and/or to manage the network (for example, by retrieving, instantiating and invoking dynamic discovery and/or management applications in response to predictions the predictor provides).

7.3.4 Example Prediction Data

FIGS. 8A and 8B depict plots (8100*a*, 8100*b*, 8100*c*) of predicted DLAD data values (8200*a*, 8200*b*, 8200*c*), generated by a DLAD processing device in accordance with one or more prediction calculation rules (6167), and collected DLAD data values (8300*a*, 8300*b*, 8300*c*) which are collected by the DLAD processing device according to specifications encoded in a collected data sources and collection methods specification (6050). The DLAD processing device also generates upper bounds (8210*a*, 8210*b*, 8210*c*) and lower bounds (8220*a*, 8220*b*, 8220*c*) of predicted DLAD data values which represent extremes of normal expected DLAD data values which may be encoded as threshold values for generation of alerts and/or events in one event and alert rules (6163).

The DLAD processing device compares collected DLAD data values to the predefined upper and lower bounds in a DLAD specification, classifies any collected DLAD data values that are located outside of the upper and lower bounds (e.g., 8350 through 8355) as anomalous, and generates alerts or performs one or more other actions specified by a DLAD specification if it classifies a collected DLAD data value or group of collected DLAD data values as anomalous.

Referring to FIG. 8A, a DLAD processor compares collected data values (8300*a*) to normal patterns of device behavior encoded in the normal behavior specification or dataset cluster specification of one or more analysis rules (6162). The DLAD processor determines, based on the comparison, that data samples (8350) include anomalous DLAD collected data values. For example, the DLAD processor determines that magnitudes of data samples (8350) include collected DLAD data values that are representative of spikes in CPU utilization magnitude having values greater than predicted values encoded in a learned operational behavior specification of an analysis rule (6162) that specifies values predicted to occur during a time period of low load for the CPU that generated the collected DLAD data values (8300*a*). The DLAD processor further determines that the magnitude of data samples (8350) fall outside of an alert threshold (8210*a*) specified by an event and alert rule (6163). In response to the determination, the DLAD processor generates and alert and/or further actions specified by the event and alert rule.

Referring to FIG. 8B, a DLAD processor determines that collected DLAD data values (8351, 8352, 8353) are anomalous based on comparison to normal patterns of device behavior encoded in the normal behavior specification or dataset cluster specification of a first analysis rules (6162). The DLAD processor further determines that group (8354) of collected DLAD data values include a cluster of collected DLAD data values that are outside of a normal cluster of values, as defined by dataset cluster parameters of a second analysis rule. In the illustrated example, anomalous cluster (8354) is representative of flatlined CPU utilization during times wherein the DLAD processing device CPU utilization magnitude values are to predicted to fluctuate according to a normal pattern specification encoded in an analysis rule (6162). In an exemplary embodiment, the DLAD processing device determines that, according to an event and alert rule (6163), single instances of anomalous DLAD data values (8351, 8352, 8353) do not merit generation of an alert or event. However, the DLAD processing device determines, based on the event and alert rule, that detection of the anomalous cluster of group (8354) should trigger an alert and/or event and, in response initiates one or more events and/or alerts specified by the event and alert rule. In an example response, the DLAD processing device generates an alert that includes notification regarding the flatlined CPU utilization and initiates a workflow to perform additional discovery related to the flatlined CPU usage

7.4 Conclusions

It will also be recognized by those skilled in the art that, while the technology has been described above in terms of preferred embodiments, it is not limited thereto. Various features and aspects of the above described technology may be used individually or jointly. Thus, features of one disclosed embodiment may be used with features of another disclosed embodiment, or a further embodiment may include some or all features of both embodiments. Further, although the technology has been described in the context of its implementation in a particular environment, and for particular application examples, those skilled in the art will recognize that its usefulness is not limited thereto and that the present technology can be beneficially utilized in any number of environments and implementations where it is desirable to create and process DLAD values that describe previously unmeasurable aspects of a computing environment. Accordingly, the claims set forth below should be construed in view of the full breadth and spirit of the technology as disclosed herein and encompass all variations and improvements within the spirit and scope of the appended claims.

All items cited above are incorporated herein by reference as if expressly set forth.

The invention claimed is:

1. A network management method comprising:
providing a portable encoding of an initial machine learning-trained hyperparameter data set parameterizing collected information relating to executing software components of at least one proto-typical network device as a dynamic application configured for execution at a target network management domain, the initial machine learning-trained hyperparameter data set providing initial parameters for local machine learning using local data and a model which was initialized non-locally about executing software component characteristics of devices that are part of the target network management domain;
configuring execution of a machine-learning environment to incorporate information from the dynamic application including data from at least one data source the dynamic application specifies;
configuring the dynamic application to use the initial machine learning-trained hyperparameter data set to monitor at least one set of data collected from the target network management domain; and
based on the monitoring, using (a) the initial machine learning-trained hyperparameter data set or a hyperparameter data set derived, at least in part, from the machine learning-trained hyperparameter data set and (b) the at least one data source to discover operational condition events in the monitored at least one set of data collected from the target network management domain.

2. The network management method of claim 1 further comprising further training the initial machine learning-trained hyperparameter data set at the target network management domain with the monitored at least one set of data to derive a locally trained hyperparameter data set.

3. The network management method of claim 2 further comprising using the locally trained hyperparameter data set to configure a deep neural network.

4. The network management method of claim 1 further comprising determining whether a discovered operational condition event associated with one or more data set elements comprises an anomaly event.

5. The network management method of claim 1 further comprising:
using the machine learning trained hyperparameter data set to monitor discovered operational condition events and predict whether the events are anomalous; and
using results of the prediction to manage at least one aspect of the target network management domain.

6. The network management method of claim 5 further comprising:
configuring an alerting component for anomalous value thresholds of a monitored data set in accordance with the anomaly determination,
comparing a collected data set value against the anomalous value thresholds, and
generating an alert or notification upon the comparison indicating the collected data set value is outside at least one of the anomalous value thresholds.

7. The network management method of claim 5, further comprising calculating one or more predicted future data values for a monitored data set and storing the calculated predicted future data values.

8. The network management method of claim 1 further comprising using event tags to predict whether observed events represented by the collected data are anomalous.

9. The network management method of claim 1 further comprising using a model registry and a training handler to interface with the machine learning trained hyperparameter data set.

10. The network management method of claim 1 further comprising configuring the dynamic application using a DLAD specification.

11. The network management method of claim 1 wherein discovering anomalies comprises running the dynamic application as part of a DLAD engine of a network management device.

12. The network management method of claim 1 wherein the hyperparameter data set comprises a configuration for a trained model that is external to the trained model and is used to parameterize use of the trained model.

13. A target network management domain comprising:
a storage that stores a portable encoding of an initial machine learning-trained hyperparameter data set parameterizing collected information relating to executing software components of at least one proto-typical network device as a dynamic application configured for execution at the target network management domain, the initial machine learning-trained hyperparameter data set providing initial parameters for local machine learning using local data and a model which was initialized non-locally about executing software component characteristics of devices that are part of the target network management domain; and
a processor operatively coupled to the storage and configured to execute a machine-learning environment incorporating information from the dynamic application including data from at least one data source the dynamic application specifies, the dynamic application using the initial machine learning-trained hyperparameter data set to monitor at least one set of data collected from the target network management domain;
the dynamic application executed by the processor being further configured to, based on the monitoring, use (a) the initial machine learning-trained hyperparameter data set or a hyperparameter data set derived, at least in part, from the machine learning-trained hyperparameter data set, and (b) the at least one data source to discover operational condition events in the monitored at least one set of data collected from the target network management domain.

14. The target network management domain of claim 13 wherein the processor is further configured to further train the initial machine learning-trained hyperparameter data set at the target network management domain with the monitored at least one set of data to derive a locally trained hyperparameter data set.

15. The target network management domain of claim 14 wherein the processor executes a deep neural network configured to use the locally trained hyperparameter data set.

16. The target network management domain of claim 13 wherein the processor is further configured to determine whether a discovered operational condition event associated with one or more data set elements comprises an anomaly event.

17. The target network management domain of claim 13 wherein the processor is further configured to:

use the machine learning-trained hyperparameter data set to monitor discovered operational condition events and predict whether the events are anomalous; and use results of the prediction to manage at least one aspect of the target network management domain.

18. The target network management domain of claim 17 wherein the processor is further configured to:

execute an alerting routine for anomalous value thresholds of a monitored data set in accordance with the anomaly determination, compare a collected data set value against the anomalous value thresholds, and generate an alert or notification upon the comparison indicating the collected data set value is outside at least one of the anomalous value thresholds.

19. The target network management domain of claim 17, wherein the processor is further configured to calculate one or more predicted future data values for a monitored data set and store the calculated predicted future data values.

20. The target network management domain of claim 13 wherein the processor is further configured to use event tags to predict whether observed events represented by the collected data are anomalous.

21. The target network management domain of claim 13 wherein the processor is further configured to use a model registry and a training handler to interface with the machine learning-trained hyperparameter data set.

22. The target network management domain of claim 13 wherein the dynamic application is configured using a DLAD specification.

23. The target network management domain of claim 13 wherein the processor is further configured to provide a DLAD engine of a network management device running the dynamic application to discover anomalies.

24. The target network management domain of claim 13 wherein the hyperparameter data set comprises a configuration for a trained model that is external to the trained model and is used to parameterize use of the trained model.

* * * * *